United States Patent [19]
Hartmann et al.

[11] Patent Number: 5,566,161
[45] Date of Patent: Oct. 15, 1996

[54] ADAPTIVE DS1 FRAME FORMAT CONVERSION DEVICE FOR REMOTELY MONITORING AND TESTING THE PERFORMANCE OF TELEPHONE CIRCUITS

[76] Inventors: Paul R. Hartmann, 2720 Richlynn Ridge Rd., Escondido, Calif. 92025; Raymond L. Behr, 1020 Campbell Rd., Lawrenceville, Ga. 30245; George A. Wissing, 173 Clarence Rd., Scarsdale, N.Y. 10583; Robert G. Young, 13162 Hwy. 8E, #191, El Cajon, Calif. 92020; Ramone A. Hecker, 229 23rd St., Del Mar, Calif. 92014; Maynard A. Wright, 6030 Enright Dr., Citrus Heights, Calif. 95621; Edward T. Ellebracht, 190 Bahia La., Escondido, Calif. 92026

[21] Appl. No.: 372,819

[22] Filed: Dec. 23, 1994

[51] Int. Cl.$^6$ .............................. H04J 3/14; H04L 12/24; H04L 12/26
[52] U.S. Cl. ........................... 370/15; 370/82; 370/110.1; 370/17; 379/5
[58] Field of Search ................................ 370/13, 17, 15, 370/60, 60.1, 58.1, 58.2, 58.3, 68.1, 110.1, 79, 82; 379/5

[56] References Cited

U.S. PATENT DOCUMENTS

| | | | |
|---|---|---|---|
| 4,566,094 | 1/1986 | Ardon et al. | 370/66 |
| 4,797,654 | 1/1989 | Young et al. | 370/58.1 |
| 4,882,727 | 11/1989 | Williams et al. | 370/79 |
| 4,890,254 | 12/1989 | Cooley | 364/900 |
| 4,958,342 | 9/1990 | Williams et al. | 370/79 |
| 5,063,564 | 11/1991 | Crandall et al. | 370/110.1 |
| 5,208,803 | 5/1993 | Conforti et al. | 370/17 |
| 5,343,461 | 8/1994 | Barton et al. | 370/17 |
| 5,347,576 | 9/1994 | Taylor | 370/13 |

Primary Examiner—Wellington Chin
Attorney, Agent, or Firm—Baker, Maxham, Jester & Meador

[57] ABSTRACT

An improved network interface unit (NIU) for remotely monitoring and testing the performance of DS1 telephone circuits, installed on the network side of an interface between customer premises equipment (CPE) and equipment provided by the network provider. The inventive NIU is used to non-intrusively collect and transmit full-time performance monitoring data to the network provider. The inventive NIU provides continuous and non-intrusive performance monitoring of DS1 transmission systems. With the inventive NIU installed at the interface between the customer's CPE and the LECs' equipment, network service providers are alerted to potential problems before they adversely affect the service provided by the network providers to their customers. The inventive NIU enables a network service provider to quickly and non-intrusively determine whether a problem exists in the equipment provided by the network provider or in the equipment on the customer's premises. The inventive NIU, therefore, advantageously eliminates false dispatches and expensive and unnecessary troubleshooting required by prior art network interface units. The inventive NIU provides nonintrusive monitoring of CPE by facilitating the conversion of CPE-generated signal frame formats to the Extended Superframe Format (ESF) (according to the ANSI T1.403 Standard with Performance Report Message). The present invention performs an adaptive real-time DS1 circuit frame format conversion.

40 Claims, 9 Drawing Sheets

ADAPTIVE DS1 FRAME FORMAT CONVERSION DEVICE FOR REMOTELY MONITORING AND TESTING THE PERFORMANCE OF TELEPHONE CIRCUITS

BACKGROUND OF THE INVENTION

1. Field of the Invention

The present invention relates in general to the field of digital telecommunications, and more particularly to a method and apparatus for monitoring and testing the performance of circuits used to transmit digital information between a telecommunications network and a network user.

2. Description of Related Art

For some time, public switched telephone networks (PSTN) have utilized time division multiplexing (TDM) transmission systems to communicate both voice and data signals over a digital communications link. For example, DS1 data paths have long been used to carry both voice and data signals over a single transmission facility. DS1 data paths carry DS1 (digital signal level 1) signals which are transmitted at a nominal rate of 1.544 Mb/s. As is well known, DS1 data paths advantageously reduce the number of lines required to carry information that otherwise would be required without time division multiplexing the voice and data signals.

While DS1 facilities are used in large part to carry signals switched by components of the PSTN, point-to-point DS1 data links are also used to connect the premises of data users to one another. A typical application is shown in FIG. 1. Much of the growth in the network in recent years have been in such high capacity digital service (HCDS) applications.

DS1 transmission systems, like the one shown in FIG. 1, include three general equipment types: terminating equipment 10, user interface equipment 20, and transmission equipment 30. Terminating equipment 10 primarily serves to build the DS1 1.544 Mb/s TDM signal from the various sub-rate voice and data signals. Terminating equipment 10 typically performs pulse code modulation (PCM) and TDM functions. The terminating equipment 10 also de-multiplexes the 1.544 Mb/s DS1 signal to separate voice and data signals at their original sub-rates.

DS1 signals are typically transmitted over a dedicated point-to-point network as simple as the one shown in FIG. 1 utilizing twisted wire pairs and repeaters spaced at intermediate points or as complex as the one shown in FIG. 2 which may utilize any combination of twisted wire pairs and repeaters, multiplexers, Digital Cross-connect Systems (DCS), Add Drop Multiplexer (ADM), Fiber Optic Terminals (FOT), Coaxial Cable, Microwave, Satellite, or any other transmission media capable of transporting a DS1 signal. In some instances, the DS1 may be carried over a network similar to the point-to-point network with the added capability to switch the DS1 signal (in a DCS or ADM) in a manner similar to the PSTN.

The user interface equipment 20 connects the terminating equipment 10 with the transmission equipment 30, such as a DS1 data path and ensures that both of the ends of the DS1 data paths 30 send and receive a high quality DS1 signal. As such, the user interface equipment 20 typically checks for conformance to certain standards which are set by the telecommunications industry. The user interface equipment 20 corrects and detects errors in the DS1 transmission path. For example, the user interface equipment 20 corrects for Bipolar Violations (BPV). In addition, the user interface equipment 20 detects and inserts various errors, alarms, and zero substitution codes in the DS1 transmission path, including yellow alarms, alarm indication signals (AIS), and Bipolar with Eight-Zero Substitution (B8ZS) signals.

The DS1 data path 30 is the hardware used by the network providers to transmit the DS1 digital signal over a distance. The DS1 data path 30 as shown is implemented by a T1 line. However, coaxial, fiber optic cables, and microwave links may be used by providing an appropriate transport interface between the CSU 107 and the facility. Twisted pair cable used to catty DS1 signals require repeaters at approximately 7000 foot intervals.

While DS1 transmission systems such as the system shown in FIG. 1 are well-known, customers more typically communicate using a public DS1 network, as shown in FIG. 2. In the DS1 transmission system shown in FIG. 2, equipment is divided into categories based on the location of the equipment. Essentially, the equipment is broken into three categories: (1) the customer premises equipment (CPE) 40; (2) the local loop equipment 42; and (3) the central office (CO) equipment 44. CPE 40 belongs to the network user. The organization or customer that owns the CPE 40 is responsible for both its operation and maintenance. As the responsible party, the customer must ensure that its equipment provides a healthy and standard DS1 digital signal to the public local loop equipment 42. The equipment 40 on the customer premises typically consists of DS1 multiplexers 46, Digital PBXs, or any other DS1 terminating equipment which connects to the channel service units (CSU) 48. The local loop equipment 42 essentially serves to connect the CPE 40 with the central office 44. Local exchange carriers (LECs) assume responsibility for maintaining equipment at the line of demarcation between the CPE 40 and the local loop 42.

As shown in FIG. 2, a network interface unit (NIU) 50 couples the CPE 40 with the local loop 42. The NIU 50 represents the point of demarcation between the CPE 40 and the network equipment (which comprises local loop equipment 42, COs 44, and a DS1 network 52). Prior art NIUs are relatively simple devices which allow network technicians to minimally test the operation and performance of both the CPE 40 and the DS1 network 52.

Central Office equipment 44 connects the DS1 signals customers and routes the traffic through the DS1 network 52 based upon a final destination provided by the CPE 40. The Central Office equipment 44 can serve as a test access point for various DS1 signal requirements.

Independent of whether the DS1 transmission system is simple (FIG. 1), complex (FIG. 2), or switched, all the circuits and network equipment required to transmit a DS1 signal must be properly tested and maintained to operate at maximum efficiency. All DS1 testing falls into one of two categories: (1) out-of-service testing, and (2) in-service monitoring. Out-of-service testing causes live traffic to be removed from the DS1 link before testing commences. In out-of-service testing, a test instrument transmits a specific data pattern to a receiving test instrument that anticipates the sequence of the pattern being sent. Any deviation from the anticipated pattern is counted as an error by the receiving test instrument. Out-of-service testing can be conducted on a "point-to-point" basis or by creating a "loop-back". Point-to-point testing requires two test instruments (one instrument at one end of the DS1 transmission system, and one instrument at the other end of the DS1 transmission system). By simultaneously generating a test data pattern and analyzing the received data for errors, the test instruments can analyze the performance of a DS1 link in both directions.

Loop-back testing is often used as a "quick check" of circuit performance or when attattempting to isolate faulty equipment. In loop-back testing, a single test instrument sends a "loop-up" code to a loop back device, such as the CSU at the far end, before data is actually transmitted. The loop-up code causes all transmitted data to be looped back by the CSU in the direction toward the test instrument. By analyzing the received data for errors, the test instrument measures the performance of the link up to and including the far end CSU. Because loop-back testing only requires a single test instrument, and thus, only one operator, it is a convenient testing means.

Both point-to-point and loop-back tests allow detailed measurements of any DS1 transmission system. However, because both testing methods require that live, revenue-generating traffic be interrupted, they are impractical. Thus, out-of-service testing is inherently expensive and impractical. It is therefore desirable to perform in-service monitoring of "live" data to measure the performance and viability of DS1 transmission systems. Because in-service monitoring does not disrupt the transmission of live, revenue-generating traffic, it is suitable for routine maintenance and it is preferred by both the LECs and their customers.

Referring again to FIG. 2, the prior art NIUs 50 disadvantageously provide only intrusive test and performance monitoring functionality. End-user customers object to the service interruptions and disruptions required by the out-of-service testing performed by the prior art NIUs 50. The LECs install the NIUs 50 at the demarcation point between the CPE 40 and the LEC portions of the network (i.e., at the interface to the local loop 42). The prior art NIUs 50 typically have provided the LECs with a loop-back point for testing DS1 digital circuits to the network boundary. Disadvantageously, customer circuits may be taken out-of-service for intrusive testing only with customer permission. Customers typically do not authorize such intrusive testing means unless a circuit is completely unusable.

There are several types of NIUs 50 currently in use. For example, one of the most popular types of NIUs 50 is the "Smart Jack" available from Westell, Inc., located in Oakbrook, Ill. The Smart Jack NIU with Performance Monitor (PM) allows the LECs to determine what errors are received and generated by the CPE 40. A major disadvantage of the Smart Jack NIU is that the NIU accumulates PM data and stores the data in a local buffer for later retrieval by LEC personnel. Data retrieval in most areas requires that a circuit be taken completely out-of-service and that the NIU be commanded intrusively using a proprietary command set. Furthermore, the Smart Jack NIU disadvantageously provides no practical method for the LECs to retrieve the performance monitor data collected by the Smart Jack NIU. While the Smart Jack NIU does allow non-intrusive transmission of PM data from the Smart Jack to the central office, a paralleling maintenance line must be provided. Most DS1 installations to customer premises are, however, unprotected by such maintenance lines.

Other NIUs 50 are available from Wescom Integrated Network Systems (WINS), the Larus Corporation, and Teltrend, Inc., a wholly owned subsidiary of T1 Holdings, Inc., located in New York, N.Y. All of the prior art NIUs 50 suffer the disadvantages associated with out-of-service monitoring and testing. Therefore, there is a need for an improved NIU 50 which provides non-intrusive maintenance performance monitoring at the point of demarcation between the CPE 40 and the LEC equipment. In addition to being unable to provide non-intrusive testing and monitoring of DS1 digital equipment, the prior art NIUs 50 are unable to provide an indication of a loss of signal (LOS) caused by the CPE 40 which is distinguishable from LOSs that are caused by failure of the network equipment. Currently, LOS caused by the CPE 40 generates alarms in the LEC central office equipment 44 which are indistinguishable from the alarms generated in response to LOSs caused by equipment failures in the local loop 42, Central Office 44, or DS1 network 52. Therefore, there is a need for an enhanced NIU which allows the LECs to detect LOS alarm signals that originate within the CPE 40. With such an enhanced NIU, the LECs can then decide whether to notify their customers of the LOS indication or to ignore the indication as they deem appropriate.

In addition to these disadvantages, the prior art NIUs 50 do not permit the LECs to control the frame format of data transmitted by their customers and transmitted over the LECs' network. In general, DS1 signals can be transmitted to the local loop 42 using four basic DS1 frame formats: (1) Super Frame format (SF); (2) Extended Superflame Format (ESF) without Performance Report Messages (PRMs); (3) ESF with AT&T PUB 54016 Performance Reporting; and (4) ESF with ANSI T1.403 Performance Report Messages (PRMs). Most DS1 signals are transmitted using the SF format, and the remainder are transmitted by the CPE 40 using a mix of ESF format types. Performance monitoring capabilities of the various formats range from poor in the case of SF (most of the data is not monitored), to excellent, in the case of ESF with ANSI T1.403 PRMs. The difficulty faced by the LECs is that their ability to monitor data and transmission performance is tied to the frame format used by the CPE 40. Because the customer is responsible for the CPE 40, the LECs are unable to control the frame format used and thus the level and extent of performance monitoring and testing that is achievable. The present invention allows the LECs to control the frame format of data transmitted by the CPE 40.

The ESF format has long been recognized as the single most important change occurring in the telephone network with respect to the quality of service provided on DS1 circuits because it addresses the above-stated need for non-intrusive monitor and test capability. ESF allows customers to continuously and non-intrusively monitor the performance of their DS1 facilities while the applications remain active and thus income-generating. ESF performance monitoring provides both a precise performance report and a proactive maintenance tool. With ESF performance data, a customer can determine correlations between data application performance (response time) and errors which occur on the DS1 facilities. This can aid in troubleshooting end-user response time problems. By looking at the error conditions, the cause of the increased response time can be determined and the appropriate action can be taken.

In addition, the ESF frame format offers the network providers the ability to "sectionalize" problems occurring in the network. By placing ESF monitoring equipment throughout the network, an LEC can monitor the various facilities that make up an end-to-end customer circuit. When customers complain about a degraded or unavailable circuit, the LEC can use the ESF format to locate the faulty link in a real time, non-intrusive manner.

Although the ESF frame format has long been recognized as a tremendous benefit, it has gained little acceptance and use in the CPE 40. Therefore, there is a need for an improved NIU which allows telephone companies to add the ESF functionality to existing DS1 circuits. There is also a need for an enhanced NIU which will provide telephone companies an adaptive way to increase the number of circuits that use the preferred ESF signal format as the circuit enters the LEC equipment. Moreover, there is a need to combine the functions of network interface, circuit loop-back, frame format conversion, and CPE loss of signal detection functionality together in an inexpensive and easily accessible NIU. The present invention provides such an improved NIU.

SUMMARY OF THE INVENTION

The present invention is an improved network interface unit having an adaptive DS1 frame format conversion device (hereinafter referred to as the Remote Module) which is used for remotely monitoring and testing the performance of DS1 telephone circuits. The network interface unit (hereinafter referred to as a "Remote Module") is preferably installed on the network side of an interface between customer premises equipment (CPE) and equipment provided by the network provider. The Remote Module is used to non-intrusively collect and transmit full-time performance monitoring data to the network provider. The Remote Module provides continuous and non-intrusive performance monitoring of DS1 transmission systems. With the Remote Module installed at the interface between the customer's CPE and the LECs' equipment, network service providers are alerted to potential problems before they adversely affect the service provided by the network providers to their customers. The Remote Module enables a network service provider to quickly and non-intrusively determine whether a problem exists in the equipment provided by the network provider or in the equipment on the customer's premises. The Remote Module, therefore, advantageously eliminates false dispatches and expensive and unnecessary troubleshooting required by prior art network interface units.

The Remote Module provides non-intrusive testing and monitoring of CPE by facilitating the conversion of CPE-generated signal frame formats to the Extended Superframe Format (ESF) (according to the ANSI T1.403 Standard with Performance Report Message). The present invention performs an adaptive real-time DS1 circuit frame format conversion. The present invention preferably accommodates all DS1 frame formats commonly used in customer premises applications. For example, if the CPE uses an ESFformatted signal having a maintenance channel using an ANSI T1.403 standard ESF PRM signal, the present invention concatenates additional performance monitoring data, gathered by the Remote Module, onto the CPE-generated signal. In this case, the additional performance monitoring data is "piggybacked" onto the customer-generated performance report messages. Alternatively, if the customer's DS1 circuit is ESF-formatted, but the maintenance channel is not in use, the maintenance channel is used to transport the additional performance monitoring data, and no frame format conversion is performed by the Remote Module. If the customer's DS1 circuit is ESF-formatted and is carrying an AT&T PUB 50416 poll and response data, the present Remote Module inserts the ANSI PRMs into the maintenance channel, carefully observing a protocol that will avoid interference with the standard AT&T maintenance channel commands and responses. The present invention preferably passes unframed signals without modification.

The Remote Module of the present invention is an electronic circuit which combines the network interface, with the NI circuit loop-back, frame format conversion, and CPE loss-of-signal detection functions together into an inexpensive and compact device. The present invention operates transparently to the CPE. The signals generated by the CPE are returned into their original format before being transmitted to the customer. The CPE, therefore, has no access to the ESF-formatted signals if the ESF signals are not provided by the CPE. Importantly, the Remote Module provides a network loopback function as defined in ANSI T1.403 which carefully avoids superseding or tampering with the CPE loopback functionality. This is important to avoid disrupting the ability of end users to locate trouble in their own DS1 networks.

In addition to accommodate all commonly used DS1 frame formats, the present invention preferably provides an indication of Loss of Signal caused by the CPE which is distinguishable from the LOS signals caused by a failure of equipment provided by the network provider. Upon detection of a Loss of Signal from the network equipment, the Remote Module, similar to the prior art NIUs, sends an Alarm Indication Signal (AIS) to the CPE. In contrast, upon detection of an LOS from the CPE, the present invention preferably transmits a unique code to the network equipment which indicates that the LOS originated from the customer side of the network interface. The unique code is read as an AIS by elements located in the DS1 transmission system. AIS is a special signal which suppresses downstream LOS indications while, at the same time, alerting surveillance points to the existence of an upstream LOS or other qualifying condition and ensuring proper ones density in the network.

The present invention includes an auto-provisioning function which facilitates the deployment of multiple remote modules. A Remote Module in accordance with the present invention auto-provisions to a frame format conversion mode of operation when it detects the presence of a second Remote Module positioned at a distant end of the DS1 transmission system. The auto-provisioning function allows Remote Modules which are installed subsequent to the installation of other Remote Modules in a DS1 transmission system to begin proper operation without requiring additional expensive site visits by network provider employees. Frame format conversion and other features provided by the present invention are remotely provisionable via a Facilities Data Link (FDL). In addition, performance monitoring data is transmitted periodically (i.e., in the perferred embodiment once per second) over the FDL, and such data can be non-intrusively accessed at a distant point within the DS1 data path.

The details of the preferred embodiment of the present invention are set forth in the accompanying drawings and the description below. Once the details of the invention are known, numerous additional innovations and changes will become obvious to one skilled in the art.

BRIEF DESCRIPTION OF THE DRAWINGS

Like reference numbers and designations in the various drawings refer to like elements.

DETAILED DESCRIPTION OF THE INVENTION

Throughout this description, the preferred embodiment and examples shown should be considered as exemplars, rather than as limitations on the present invention.

Figure 1:
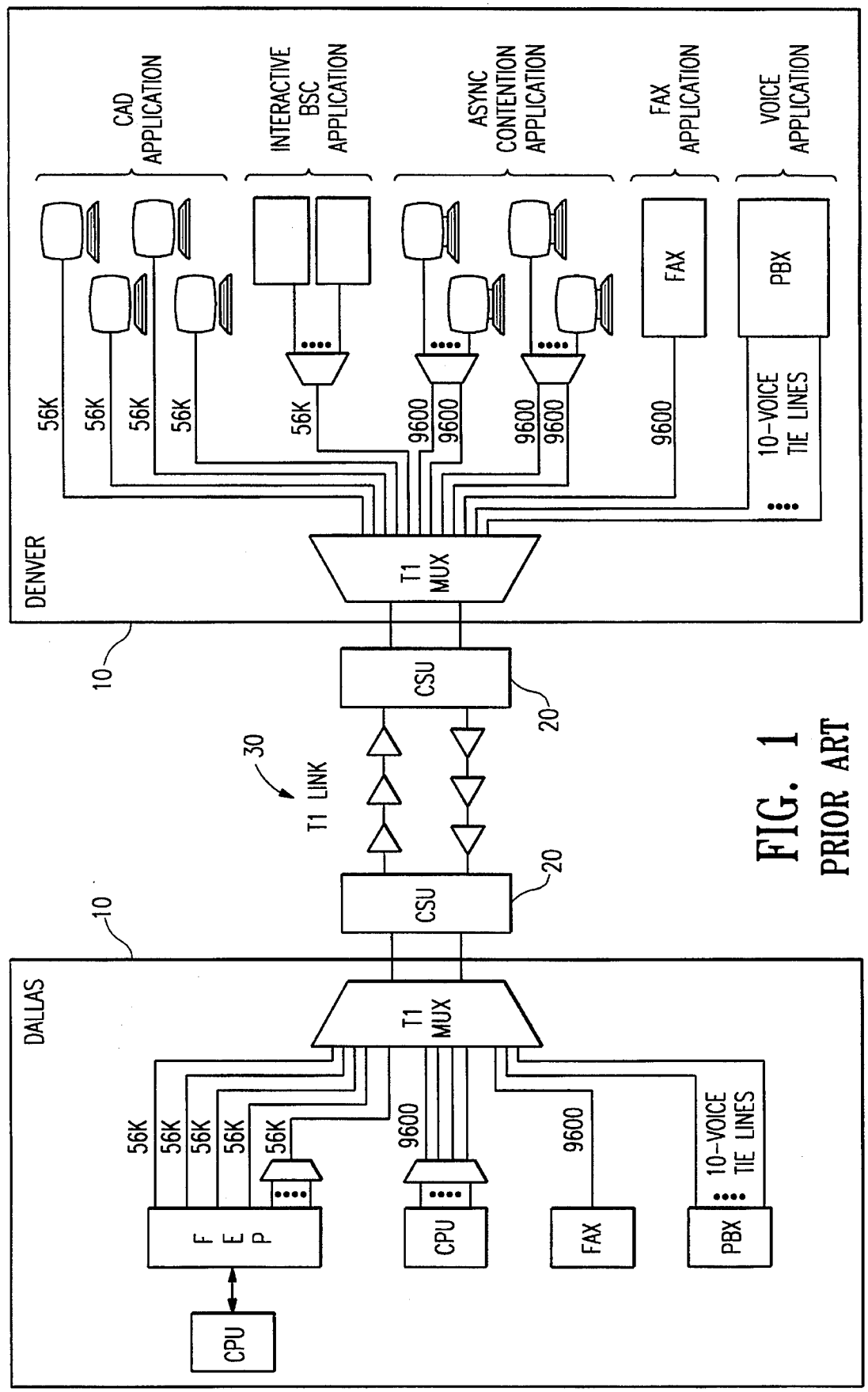
FIG. 1 is a block diagram of a relatively simple private DS1 digital communications network.
Figure 2A:
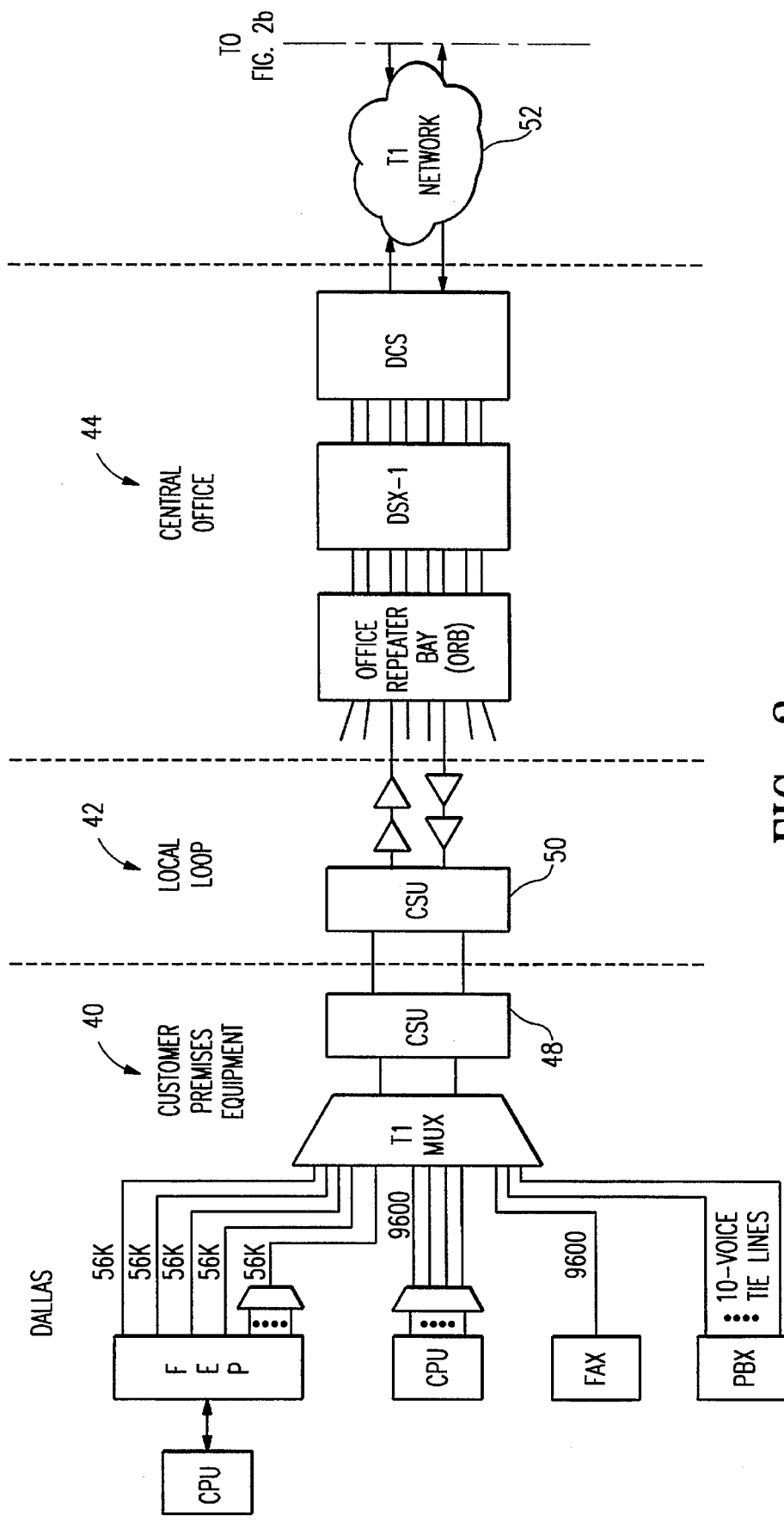
FIG. 2 is a block diagram of a complex public DS1 communications network.
Figure 2B:
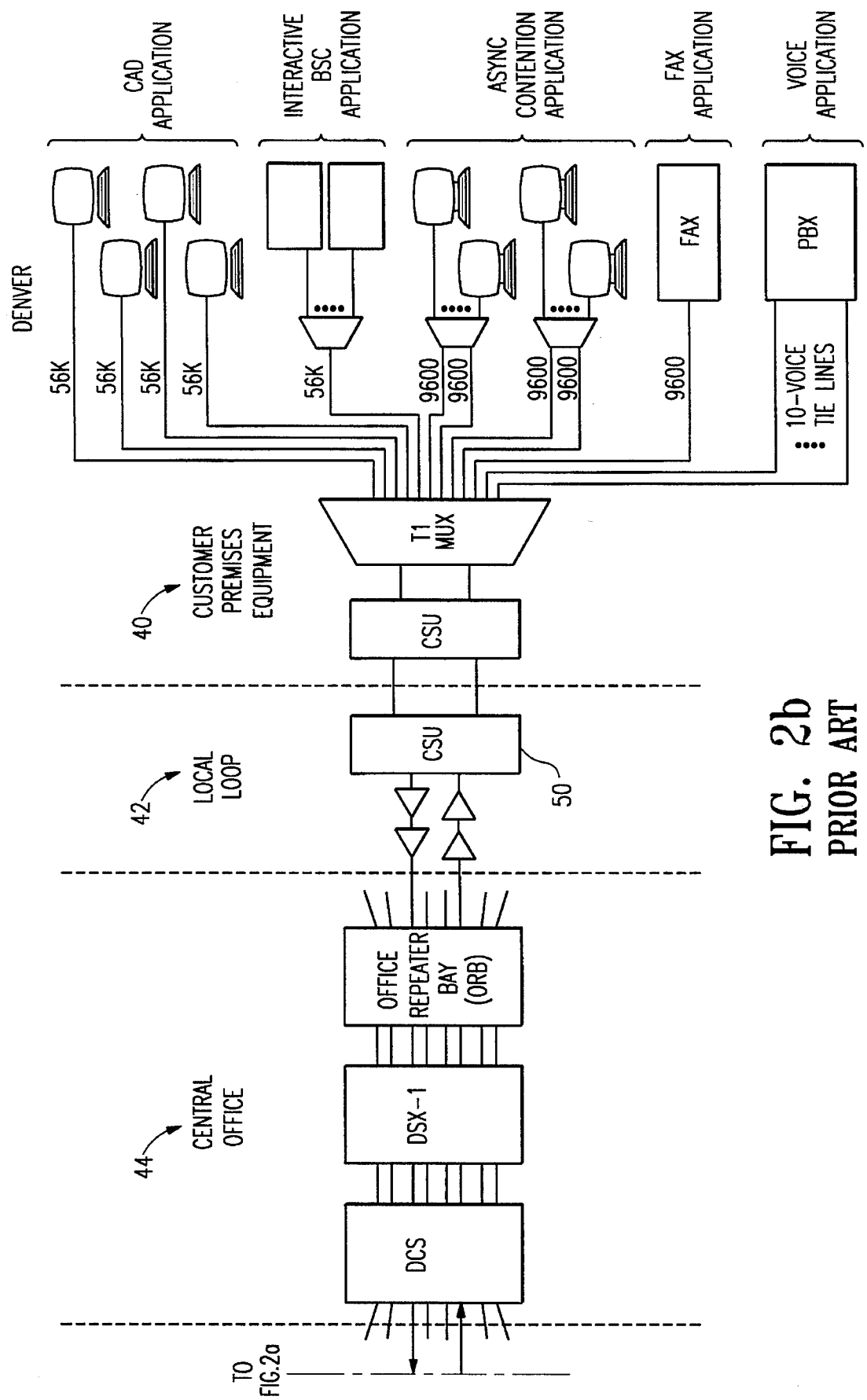
Figure 3A:
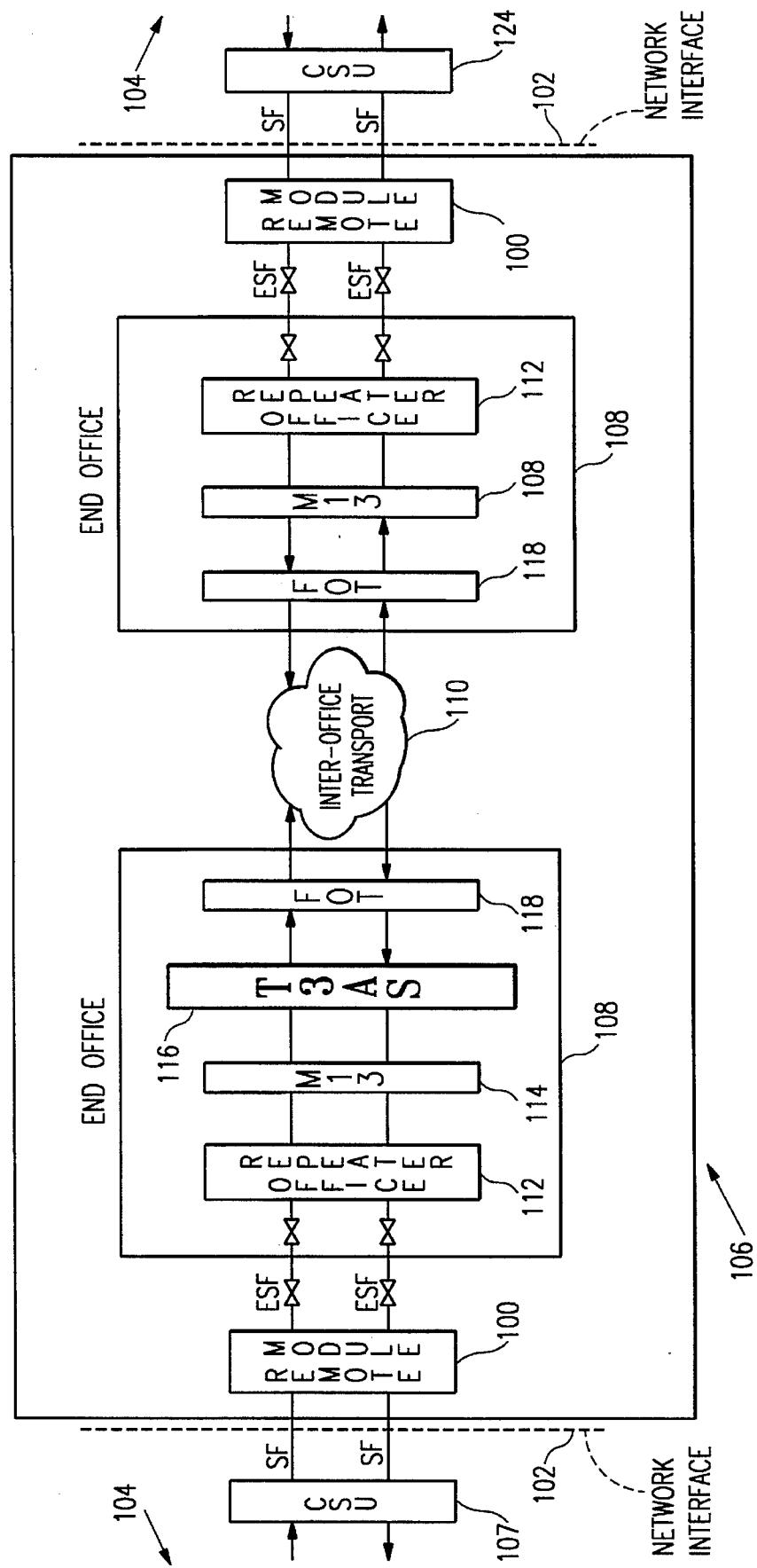
FIG. 3a is a block diagram of a public DS1 data path employing the remote module of the present invention.

FIG. 3a shows a public DS1 network employing an inventive network interface unit 100 (hereinafter referred to as a "Remote Module") in accordance with the present invention. As shown in FIG. 3a, the Remote Module 100 is preferably placed at the point of demarcation (network interface) 102 between the customer premises equipment (CPE) 104 and the telephone network 106. In one embodiment shown in FIG. 3a, the telephone network 106 includes two end offices 108 and an inter-office transport 110. The CPE 104 comprises a channel service unit (CSU) 107. The end offices 108 include an office repeater 112, an M13 block 114, a test and performance monitoring equipment block 116, and a fiber optic terminal (FOT) interface 118. The office repeater 112 amplifies the DS1 digital signal for transmission to the remote module 100. The multiplexer portion of an M13 block 114 accepts 28 DS1 signals which may or may not be operating asynchronously and multiplexes them into a single DS3 signal using the DS2 level of the Noah American hierarchy as an intermediate step. The demultiplexer portion of the M13 block 114 reverses the process, dismantling the DS3 signal into its 28 constituent DS1s. The test and performance monitoring equipment block 116 monitors the data transmitted between the two remote modules 100. The inter-office transport 110 may include one or a plurality of fiber optic links, line of sight microwave link, or any other transport means. In these cases, the FOT 118 would alternatively be replaced with an appropriate transport interface.

The Remote Module 100 allows the telephone network providers to control the frame formats used by the DS1 circuits in their network, independent of the configuration and functionality of the CPE 104. The Remote Module 100 combines, in a compact and an inexpensive unit, the CPE-to-telephone network interface, controlled circuit loop-back, frame format conversion, and CPE loss of signal (LOS) identification functions. The Remote Modules 100 provide three major features which enhance the performance monitoring and testing capability of the network providers.

First, the Remote Module 100 can optionally convert the CPE generated Superframe (SF) formatted digital signals into Extended Superframe (ESF) formatted signals for transmission over the DS1 transmission system. Frame format conversion allows the local exchange carriers (LECs) to conform their networks to the superior ANSI T1.403 ESF frame format ("ESF frame format"). The ESF frame format permits "Performance Report Messages" (PRMs) to be transmitted together with digital data over the DS1 transmission system. In addition, the ESF frame format enables the LECs to perform non-intrusive, continuous performance monitoring of both the CPE 104 and the telephone network 106.

Figure 3B:
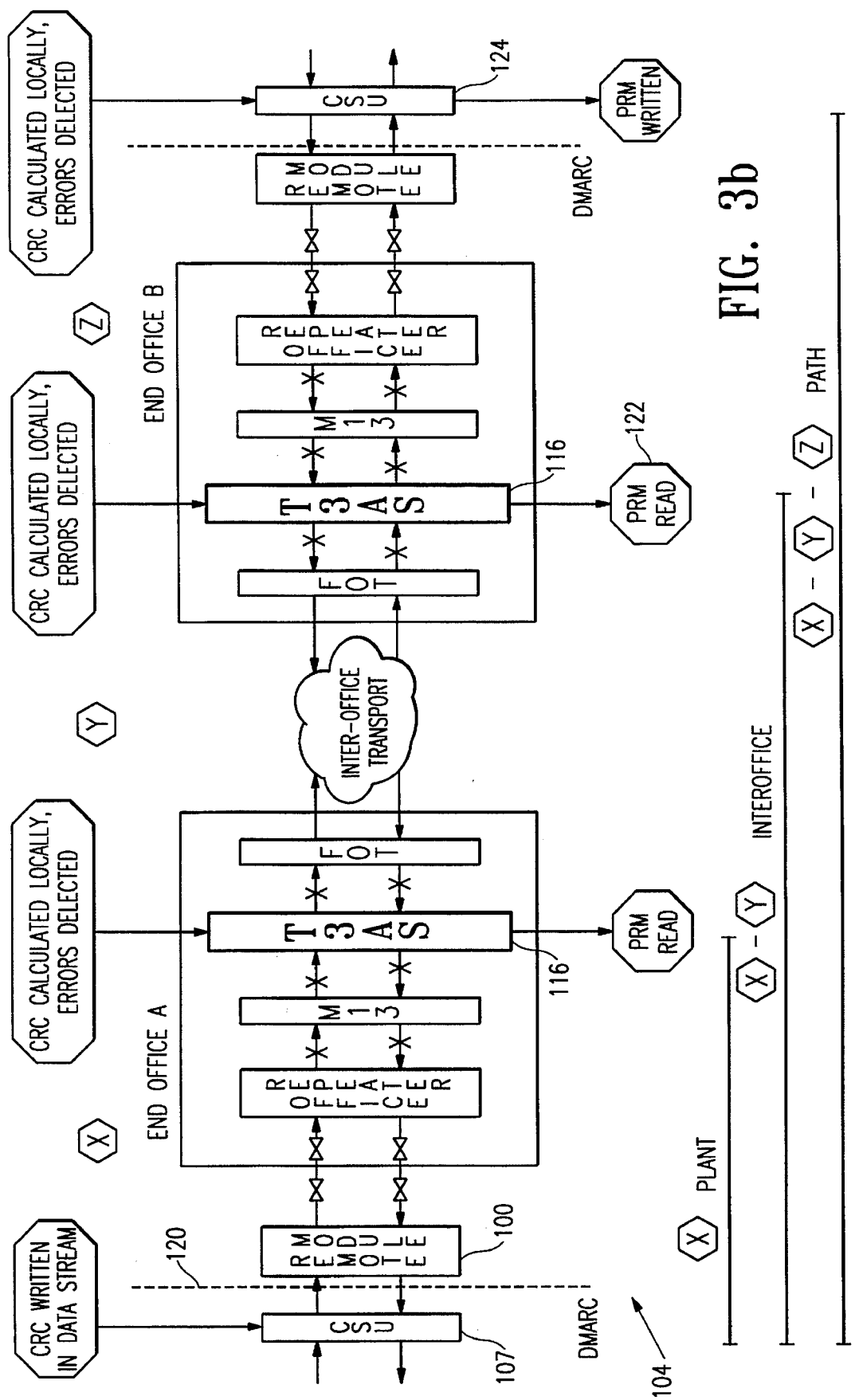
FIG. 3b shows how the present invention is used in a public DS1 data path to enhance the sectionalization capability of existing DS1 networks.

Second, the present invention is capable of performance monitoring using the ANSI T1.403 ESF Facilities Data Link (FDL). Cyclic Redundancy Codes (CRCs) and other performance monitoring data can be generated at one end of a DS1 transmission system and periodically (i.e., preferably once per second) transmitted back to some other point in the system in a non-intrusive manner using the FDL. For example, as shown in FIG. 3b, a CRC code may be written into the data stream via the CSU 107. Errors can be detected by the remote module 100 and transmitted in PRMs in an ESF-converted digital signal. The PRMs can then be read by network elements located throughout the DS1 transmission system. For example, the PRMs may be read by the test and performance monitoring block 116. Alternatively, the PRMs may be transmitted throughout the network using the ESF format and may therefore be made available to local users or Operations Support Systems (OSSs). As shown in FIG. 3b, the test and performance monitoring block 116 serves as a central hub for collecting performance monitoring data which is transmitted as ESF-formatted DS1 digital signals. In alternative embodiments of the DS1 transmission system shown in FIG. 3b, the test and performance monitoring block 116 is modified to screen and analyze performance monitoring data which is generated by the Remote Modules 100 in accordance with the present invention. In this alternative embodiment, the test and performance monitoring block 116 functions as a mediation device for the Operations Support Systems.

Third, the present invention increases the value and utility of the test and performance monitoring blocks 116 currently in use in intra-LATA (Local Access and Transport Areas) circuits by enhancing the sectionalization capability of existing DS1 transmission systems. The sectionalization function performed by the test and performance monitoring blocks 116 on the intra-LATA circuits is shown in FIGS. 3a and 3b. The Remote Module 100 enables the test and performance monitoring blocks 116 to non-intrusively sectionalize problems occurring within the DS1 transmission system on intra-LATA circuits, and thereby greatly enhances troubleshooting capability. The Remote Module 100 allows the LECs to sectionalize trouble by allowing the PRMs which are generated by the Remote Module 100 to be read at several different locations throughout the DS1 transmission system. By monitoring the difference in error counts at various locations within the network, at which performance monitoring information is collected, troubled network elements can be quickly and efficiently isolated to specific sections within the DS1 transmission system.

By converting the CPE-generated signals into an ESF format, the LECs can monitor the various facilities that make up an end-to-end DS1 transmission system. Therefore, when customers complain about degraded or unavailable circuits, the network provider can use the ESF format to locate the faulty equipment in a real-time, non-intrusive manner. For example, and referring now to FIG. 3b, if the CRC codes generated by the customer's CSU 107 were monitored at a position 120, and found to contain 20 error events, the CSU 107, 124 or other customer owned equipment would be deemed to be responsible for the errors. If at a position 122 the same data now contained 30 error events, the network provider would be deemed to be responsible for 10 of the 30 error events. When the CRCs arrive at the far-end CSU 124, they are checked by the customer's CSU 124. If the data still contains 30 error events from end-to-end, then the network from 122 is deemed to have been error free because there is no change from the number of error events detected at position 122. The same principle may be used in the reverse direction. Thus, the Remote Module 100 in accordance with the present invention solves a regulatory and jurisdictional problem for the telephone network providers. That is, LECs are responsible for providing quality of service but have no control over or right to specify CPE which would enable them to monitor quality of service and therefore provide it.

The ESF format also provides network providers the ability to pro-actively monitor networks for "bad" or marginally bad facilities and to fix internal problems before customers notice a degradation in service. This capability moves the network providers closer to offering a "self-healing" network to their customers. From a customer's perspective, an ESF-converted network, facilitated by the Remote Module 100 of the present invention, advantageously increases the availability of the network, increases efficiency and decreases the down-time associated with the prior art network interface units.

The Remote Modules 100 of the present invention, e.g., shown in FIG. 3a, are transparent to the CPE 104. Signals are re-converted into their original format before being transmitted to the CPE 104. The Remote Modules 100 are preferably compatible with all commonly used DS1 formats. Frame format conversion and the addition of an FDL maintenance channel do not adversely affect customer payload data. For example, if the CPE 104 generates an SF-formatted digital DS1 signal, the DS1 signal is converted into an ESF-formatted signal for transmission over the network 106. Conversely, ESF-formatted digital DS1 signals are converted by the Remote Modules 100 to SF-formatted signals when the CPE 104 operates using that format.

Figure 4:
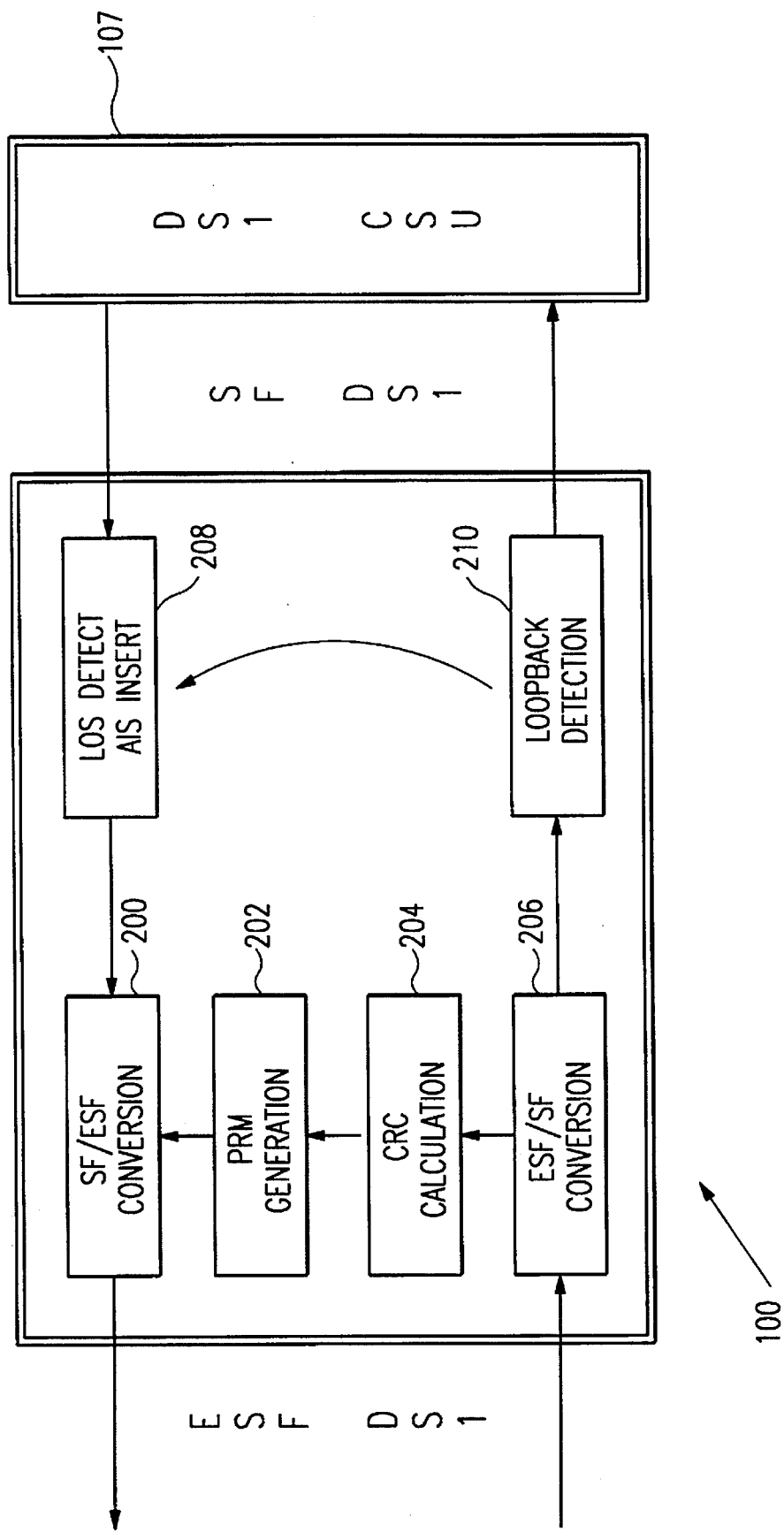
FIG. 4 is a fimctional block diagram of the remote module of FIGS. 3a and 3b.

FIG. 4 shows a block diagram of the Remote Module 100 of FIGS. 3a and 3b. As shown in FIG. 4, the Remote Module 100 includes an SF-to-ESF frame format converter 200, a PRM generator 202, a CRC block 204, an ESF-to-SF frame format converter 206, a LOS detector and alarm indication signal (AIS) insertion block 208, and a loop-back detection block 210. As described above, the frame formats used to transmit the DS1 signals are selected by the end users and are typically determined by the type of CSU 107 used by the end users.

New model CSUs typically provide users with an option for selecting between the SF and ESF frame formats. However, most of the CSUs currently in use provide only the SF frame format. The SF-to-ESF converter block 200 of the Remote Module 100 changes the superframe (SF) formatted signal (having only 12 frames) to an extended superframe signal (ESF) having 24 frames, each frame having 193 bits of data. In both the SF and ESF frame formats, the 193rd bit of each frame is used as an overhead bit.

The SF and ESF frame formats have 8 kb/s of overhead capacity. In the ESF frame format, the overhead capacity per extended superframe are divided into three independent channels having capacities as indicated below:

fps (framing): 2 kb/s

CRC (error checking): 2 kb/s

FDL (facility data link): 4 kb/s

An fps pattern is repeated on a per extended superframe basis. The CRC is also repeated on a per extended superframe basis. However, a polynomial remainder carried by the CRC bits results from a polynomial division carried out over the payload bits of the previous extended superframe. Although the fps and CRC bits repeat in patterns which are synchronous with, and fully contained within, the boundaries of an extended superframe, such is not the case with the FDL. The three types of patterns carried by the FDL have lengths as follows:

HDLC flags (idle code): 8 bits unscheduled message: 16 bits scheduled message (PRM without stuffing): 104 bits.

The FDL provides 12 bits per superframe. It is not possible to align any of the possible FDL patterns exactly on extended superframe boundaries and all of them overlie extended superframe boundaries in most instances. The overhead capacity of an ESF formatted DS1 signal therefore is occupied by three separate and distinct signals.

When converting from the SF to the ESF frame format, the SF-to-ESF converter 200 uses the frame, signal management, and CRC overhead bits in accordance with the provisions of AT&T PUB 54016 and ANSI T1.403. The Remote Module 100 implements the ANSI T1.403 FDL protocol, which allows performance report messages to be transmitted between the Remote Module 100 and an element in the telephone network 106.

The SF-to-ESF converter 200 and the ESF-to-SF converter 206 provide the Remote Module 100 with the ability to make use of an unused customer FDL as with SF and ESFformatted signals not in ANSI T1.403 ESF format. The Remote Module 100 converts such an FDL into the ANSI T1.403 ESF format by adding PRMs to the unused FDL. Therefore, the conversion blocks 200, 206, allow the LEC to operate its network in the ANSI T1.403 ESF format regardless of the framing format used by the CPE. For example, if the customer's CSU 107, 124 uses the ANSI T1.'403 ESF frame format, the Remote Module 100 does not alter the frame format for transmission to the telephone network 106. However, if the customer's CSU 107, 124 uses the SF or a non-ANSI T1.403 format, the Remote Module 100, and more specifically the converter blocks 200, 206, convert the unused customer FDL to the ANSI T1.403 ESF frame format by adding PRMs. The ANSI T1.403 ESF-formatted signal is transmitted by the Remote Module 100 to the telephone network 106. The ESF-to-SF conversion block 206 converts the ESF formatted DS1 signal into the SF format used by the CSUs 107, 124.

The Remote Module implements a protocol which prevents its PRMs from interfering with the transmission of AT&T PUB 54016 data if such data is present in the FDL. The Remote Module momentarily delays PUB 54016 polls and responses and releases them in an uncorrupted manner.

The conversion blocks 200, 206 function differently depending upon the specific version of the ESF DS1 format used by the CSUs 107, 124. For example, when the CSUs 107, 124 use the ESF format without PRMs, CRC calculations are performed on the signal as it is transmitted to the CSUs 107, 124. The PRMs are written into the signal transmitted by the CSUs 107, 124 in the same manner as they would normally be written by the CSUs 107, 124 if the CSU 107, 124 were operating in conformance with the ANSI T1.403 ESF standard. When the CSUs 107, 124 use the ESF with AT&T PUB 54016 data, the CRC calculations are performed on the signal in the direction of transmission toward the CPE 104 (i.e., toward CSU 107). In this case, the PRMs are written into the signal as it is transmitted toward the telephone network 106. When the CSUs 107, 124 are interrogated by a network element (via a facilities data link), PUB 54016 messages are momentarily delayed so as to avoid collision with T1.403 messages. At most, PUB 54016 data is delayed for no longer than 20 milliseconds. The SF-to-ESF converter block 200 and the ESF-to-SF converter block 206 inhibit the insertion of the PRMs until the AT&T PUB 54016 Performance Report is transmitted back to the network. If the CSUs 107, 124 use an ANSI T1.403 ESF format (PRMs present), the converter blocks 200, 206 simply pass the signals transparently in both directions of transmission.

Figure 5:
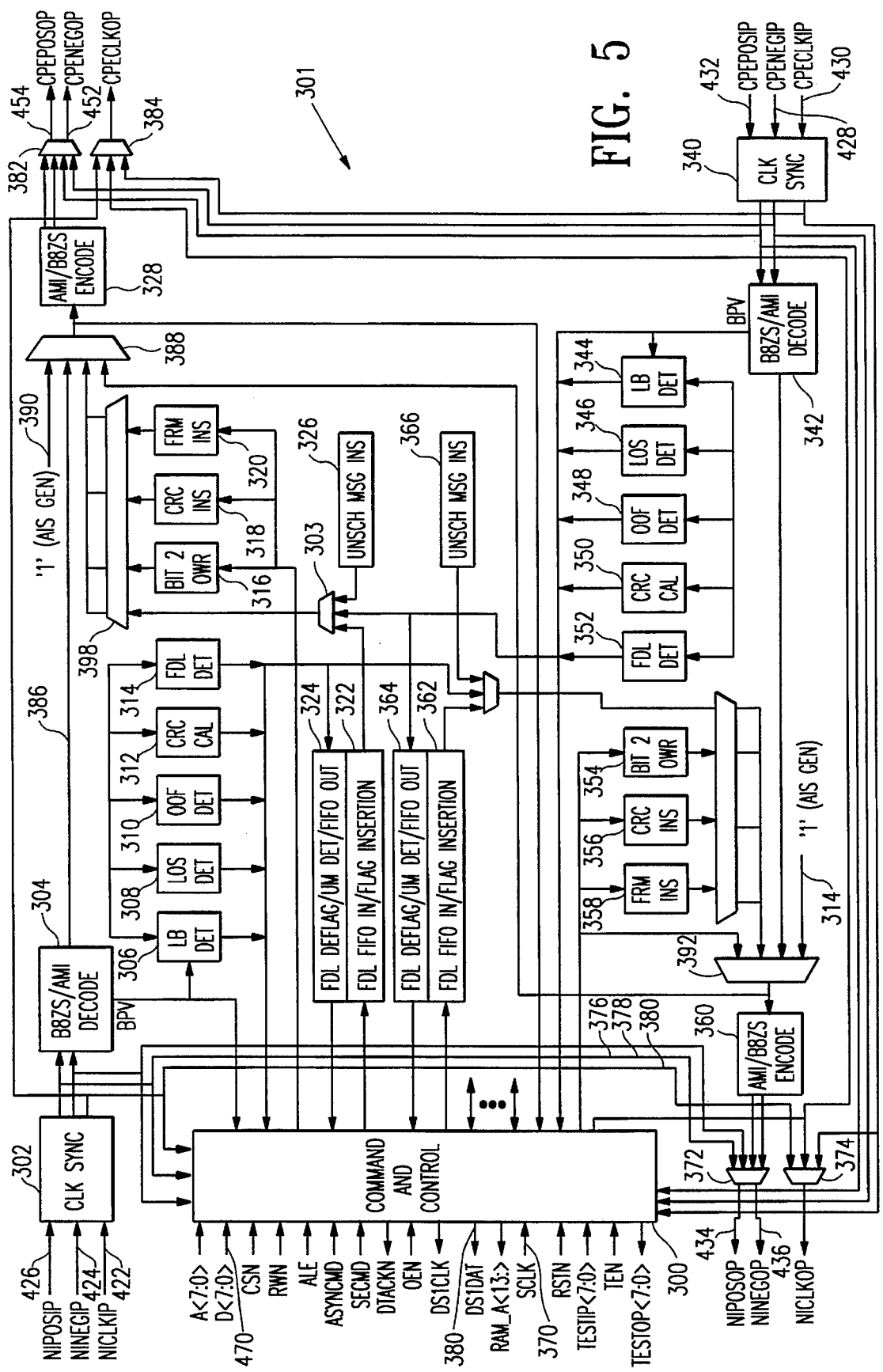
FIG. 5 is a detailed block diagram of an integrated circuit which implements many of the key functions provided by the present invention.

FIG. 5 shows a block diagram of an application specific integrated circuit (ASIC) 301 which implements many of the functions of the Remote Module 100 of FIGS. 3a, 3b, and 4. The ASIC 301 of FIG. 5 may generally be broken down into two halves: a top (receive) half used to accept network signals as input and generate signals to the customer premises equipment on output, and a bottom (transmit) half which accepts digital signals from the customer premises equipment and generates signals for transmission over the network. The receive half (i.e., network-to-CPE) includes a clock synchronizer (CLK SYNC) 302, a B8ZS/AMI decode block 304, an LB detector block 306, an LOS detector block 308, an Out-Of-Frame (OOF) detector block 310, a CRC calculation block 312, an FDL detector block 314, a bit 2 overwrite (OR) block 316, a CRC insertion block 318, a frame (FRM) insertion block 320, an FDL input FIFO 322, an FDL output FIFO 324, a UNSCH MSG INS block 326, and an AMI/B8ZS encode block 328. The transmit half (i.e., CPE-to-network) of the ASIC 301 includes a clock synchronizer (CLK SYNC) block 340, a BSZS/AMI decode block 342, an LB detector block 344, an LOS detector 346, an Out-Of-Frame (OOF) detector 348, a CRC calculation block 350, an FDL detector block 352, a bit 2 overwrite (OR) block 354, a CRC insertion block 356, an FRM INS block 358, an AMI/BSZS encode block 360, an FDL input FIFO 362, an FDL output FIFO 364, and an UNSCH MSG INS block 366. Both the receive (network-to-CPE) and the transmit (CPE-to-network) halves of the ASIC 301 are controlled by a command and control block 300.

All processing of data within the Remote Module 100 is synchronized to the Remote Module master clock SCLK 370. However, the data received from the network 106 and the customer premises equipment is independently clocked and synchronized to their associated DS1 incoming clocks by the clock synchronizing blocks 302 and 340. The FIFOs 322, 324, 362, and 364, facilitate the transfer of data between the telephone network 106 and the customer through-paths and the portions of the Remote Module 100 which are synchronous to the SCLK 370.

The key functions provided by the ASIC 301 of FIG. 5 include the ability to perform loop-back functions, LOS detection via the LOS detector blocks 308, 346, AIS generation, frame format conversion, and performance monitoring functions. These key functions are performed by the present Remote Module 100 on both the input and output signals (i.e., the signal received from the telephone network 106 by the CPE 104 and the signal transmitted by the CPE 104 to the telephone network 106).

Performance monitoring on both the telephone network 106 and customer signals generated by the CPE 104 includes conventional LOS detection, Bipolar Violation detection, frame bit error (FBE) and CRC error detection. In addition, the Remote Module 100 has the ability to overwrite data which is transmitted from the telephone network 106 to the customer's CPE 104. The Remote Module 100 preferably can overwrite both the frame bit (FB) and the AIS. Similarly, the Remote Module 100 can overwrite data transmitted by the customer's CPE 104 to the telephone network 106. For example, the Remote Module 100 can overwrite the FB, CRC, FDL/PRM, RAI (standard and non-standard versions), RAI alternative ("bit 2 overwrite") and AIS bits. The symmetrical performance monitoring and overwrite capability on both the CPE-tonetwork and network-to-CPE data streams enhances the usefulness of the Remote Module 100 for potential future applications.

Referring to FIG. 5, the B8ZS/AMI decode block 304 and the AMI/B8ZS encode block 328 perform the line code conversion functions necessary for converting the DS1 signal received from the network. The B8ZS/AMI decode block 342 and the AMI/B8ZS encode block 360 perform symmetrical functions to the decode and encode blocks 304 and 328, respectively.

The B8ZS/AMI decode block 304, the AMI/B8ZS encode block 328, the B8ZS/AMI decode block 342, and the AMI/B8ZS encode block 360, allow the Remote Module 100 to convert between Alternate Mark Inversion (AMI) line coding and Binary with Eight Zeros Substitution (BSZS) line coding. With AMI line code conversion feature selected, AMI line coding originating on the CPE 104 is converted to B8ZS line coding by the encode block 360, so that the telephone network 106 can operate using B8ZS line coding. If B8ZS/AMI line code conversion is selected, the BSZS/AMI decode block 304 converts the B8ZS line coding originating from the telephone network 106 side of the network interface 102 into AMI line coding for transmission to the CPE 104. Terminal equipment manufactured within the last few years often support both the SF and ESF frame formats and both the AMI and BSZS line codes. Therefore, the Remote Module 100 of the present invention preferably performs AMI to B8ZS line code conversion for use with both the SF and ESF frame formats.

The LB detection blocks 306, 344 perform loop-back detection on both the customergenerated and the network-generated signals. The Remote Module 100, using the loopback detection blocks 306, 344, together with the command and control block 300, recognizes and decodes the inband and FDL-carried loop-back signals. The loop-back detection blocks 306, 344, preferably decode the loop-back signal, even in the presence of very poor DS1 signals having very high bit-error-rate (BER). The LB detection blocks 306, 344 keep track of occurrence of the loopback code as well as a side count of errored loopback codes. These counts are designed so that integration for a sufficient time results in meeting the BER requirements. This is desirable in order to detect trouble on telephone lines having signals of poor quality, even when network elements that frame the DS1 signal may not be able to function properly due to high BERs. The loop-back capability advantageously allows the Remote Module 100 to be used to troubleshoot poor quality DS1 lines.

The loop-back detector blocks 306, 344, reject cotmterfeit loop-back codes. That is, loop-back codes can be counterfeited by fault locate code stress patterns. These patterns are identified and differentiated by the blocks 306, 344, from valid loop-back codes using their unique "triplet" patterns of Bipolar Violations.

The loop-backs can be deactivated (i.e., "taken down") either remotely or locally. The loop-back detectors 306, 344, are able to take down a loop-back established by any method. This ensures that it is not possible to "lock-up" a loop-back.

The loop-back blocks 306, 344, work together with the command and control block 300 to provide the following loop-back capabilities for the Remote Module 100: (a) an inband network loop-back, (b) an FDL network loop-back, (c) an FDL payload loop-back, and (d) manual and remote loop-backs. The Remote Module 100 transparently passes line loop-back codes through the Remote Module 100, and therefore does not respond to them. The Remote Module 100 initiates a loop-back upon receipt of a 5-second duration of the repetitive pattern "11000", whether the signal is framed or unframed. The Remote Module terminates the loop-back upon receipt of a 5-second duration of the repetitive pattern "11100", whether or not the signal is framed.

In one embodiment, the FDL network loop-back is initiated upon receipt from the network of at least 4 repetitions of a predetermined pattern in the FDL. In this embodiment, that pattern is as follows: "1111111101001000". While the FDL network loop-back is in effect, the DS1 signal that is received from the network is transmitted to the network with no change in the framing format or line codes. Bipolar violation transparency is maintained so that the fault locate signals are passed through the loop. The FDL network loop-back is preferably terminated upon receipt from the network of at least 4 repetitions of the following pattern: "1111111100100100".

Similarly, in one embodiment, the FDL payload loop-back is initiated upon the receipt from the network of at least 4 repetitions of a predetermined pattern. In this embodiment, the pattern is as follows: "1111111100101000". While the FDL payload loop-back is in effect, the DS1 payload bits received from the network are transmitted back to the telephone network 106. A local framing pattern is developed by the Remote Module 100 and is interleaved with the looped payload bits. In order to properly interleave the looped payload bits and the locally generated framing pattern, the framing pattern is synchronized to the incoming clock recovered from the network signal by the clock sync block 302. The FDL payload loop-back is preferably terminated upon receipt from the network of at least 4 repetitions of the following pattern: "1111111101001100".

The present Remote Module 100 can optionally be manually or remotely set into a loop-back mode. For example, a loop-back switch or locking button is provided on the Remote Module 100 so that the Remote Module 100 may be looped back locally. The local loopback is preferably toggled by a non-locking push-button switch.

During the operation of all of the loop-backs described above, with the exception of the CPE loop-back, the Remote Module 100 sends an AIS to the CPE 104 during the loopback. None of the loop-backs described above affect the operation of the power loop. All of the loop-backs time-out after 2 hours of operation unless the time-out is inhibited by a remote command. The inhibition of the time-out is removed when the associated loop-back is taken down so that subsequently initiated loop-backs are not inadvertently indefinitely enabled. The CPE loop-back may be initiated via a remote command from the telephone network 106. The CPE loop-back loops the CPE-generated signal back to the CPE 104. During the CPE loop-back, an AIS is transmitted to the network to allow the network to perform Carrier Group Alarm (CGA) functions if necessary. Advantageously, loop-backs may not be performed, nor can the state of the Remote Module 100 be affected, by sending codes of any type from the CPE 104.

Referring again to FIG. 5, the LOS detector blocks 308, 346, enable the Remote Module 100 to detect a loss of signal from both the telephone network 106 and the CPE 104. The LOS detector 308 treats a loss of signal received from the telephone network 106 conventionally by sending an AIS to the CPE 104. Remote Alarm Indication (RAI or "Yellow Alarm") signals or another signal which is compatible with existing standards, are preferably used to signal upstream equipment in the telephone network 106 of a loss of signal.

Advantageously, the present Remote Module 100 processes a loss of signal received from the CPE 104 using an AIS or other similar signal to indicate that the CPE 104 is disconnected from the telephone network 106 or is out-of-service. The AIS or other similar signal advantageously provides LEC maintenance personnel the ability to filter alarms originating from outside the telephone network 106.

The Remote Module 100, and more specifically, the LOS Detector Blocks 308, 346, preferably determines the occurrence of an LOS based solely upon logic values detected in the incoming bit stream. Power and amplitude of the incoming signals are preferably not used for LOS detection.

Upon detection of an LOS from the network signals, the Remote Module 100 sends an RAI signal to the network. If the Remote Module 100 is not converting a signal to ESF format, and the Remote Module 100 is configured to send the RAI signal, the RAI is preferably indicated by forcing "bit 2" of each channel byte to a logic 0 value for a period of not less than 1 second duration. Conversely, if a conversion to ESF format is performed by the Remote Module 100, the RAI is sent as an unscheduled FDL message in accordance with ANSI T1.403.

The command control block 300 of FIG. 5, together with a control microprocessor 400 (shown in FIG. 6) performs the ESF-to-SF and SF-to-ESF conversion functions as shown in the conversion blocks 200, 206, of FIG. 4. Control software is executed by both the command and control block 300 and the microprocessor 400. The control software controls the conversion of the CPE-generated frame format to an ESF format. Upon receipt of frames from the network, the command and control block 300 and the microprocessor 400 preferably convert the frame structure transmitted from the network to the Remote Module back to an SF format without altering the payload data bits before transmitting the frame to the CPE. The microprocessor configures of the ASIC. The control block stores configuration information for the ASIC and reports status and error counts back to the microprocessor. In order for the Remote Module 100 to transmit performance monitoring data to the network, transmission capacity is borrowed from the overhead channel present in the DS1 digital signal. The Remote Module 100 uses the 4 Kb/s FDL channel present in the ESF-formatted signals to transmit performance monitoring reports to other equipment in the DS1 transmission system. Preferably, an element in the network (a test and performance monitoring block 116 or other network element) reads and analyzes the performance monitoring data gathered by the Remote Module 100. In the preferred embodiment of the present invention, Bipolar Violations are transferred transparently through the Remote Module 100 in both directions. When the Remote Module 100 performs frame format conversion, and an incoming Bipolar Violation is detected in an overhead bit position, it is written by the Remote Module 100 into the identical overhead bit position, unless the logic value carried by that bit position is changed from a logical 1 to a 0 by the frame format conversion method performed by the present invention. When the overhead bit position is changed from a logical 1 to a 0 due to the frame format conversion performed by the Remote Module 100, no outgoing Bipolar Violation is written into the data stream. This algorithm ensures that outgoing Bipolar Violations closely correspond to incoming Bipolar Violations.

If the command and control block 300 detects a loss of frame on an incoming signal, the command and control block 300 inhibits frame format conversion until the Remote Module 100 reframes the input signal. Reframing is known and is performed under software control. Inhibiting frame conversion prevents interference with the transmission of unframed maintenance signals and fault locate codes.

Remote provisioning

The Remote Module 100 monitors the FDL channel received from the network for messages carrying commands directed to the Remote Module 100. These "provisioning commands" are preferably in the form of messages transmitted in accordance with the well-known HDLC format. The Remote Module 100 preferably responds to such provisioning commands by indicating the status of the options which can be remotely controlled and reports the success or failure of a requested change in options. The Remote Module 100, via the FDL channel, can optionally be remotely configured by any element in the DS1 transmission system. In one embodiment, many of the Remote Module selectable features and functions, including SF-ESF frame format conversion, are remotely selectable using the FDL channel. Some features of the present invention, such as use of the three extra bits in the ANSI PRM for carrying PM data, shall be disabled only by remote provisioning.

Auto provisioning

The Remote Module 100 includes an auto-provisioning function which automatically selects a frame format conversion mode of operation when the Remote Module 100 detects the presence of a second Remote Module 100 positioned in the DS1 transmission system. Auto-provisioning is desirable, since auto-provisioning allows a first Remote Module 100 to be installed at a first site and remotely activate a second Remote Module 100 at a second site, the second Remote Module 100 having been previously installed. Accordingly, there is no need to revisit the second site and second Remote Modules 100 can begin cooperating to convert frame formats.

Figure 6A:
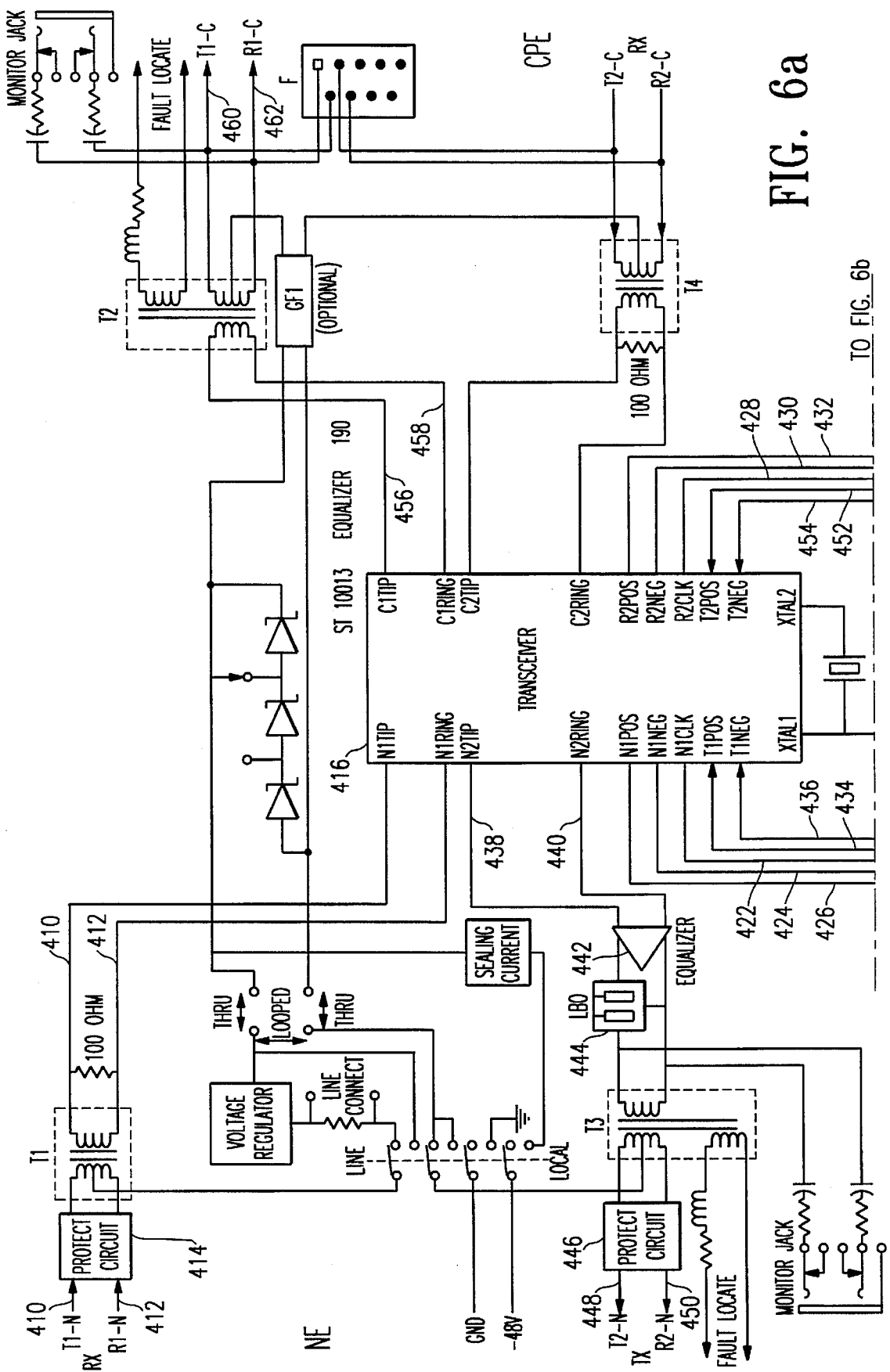
FIG. 6 is a schematic of the remote module of FIG. 4 using the integrated circuit of FIG. 5.
Figure 6B:
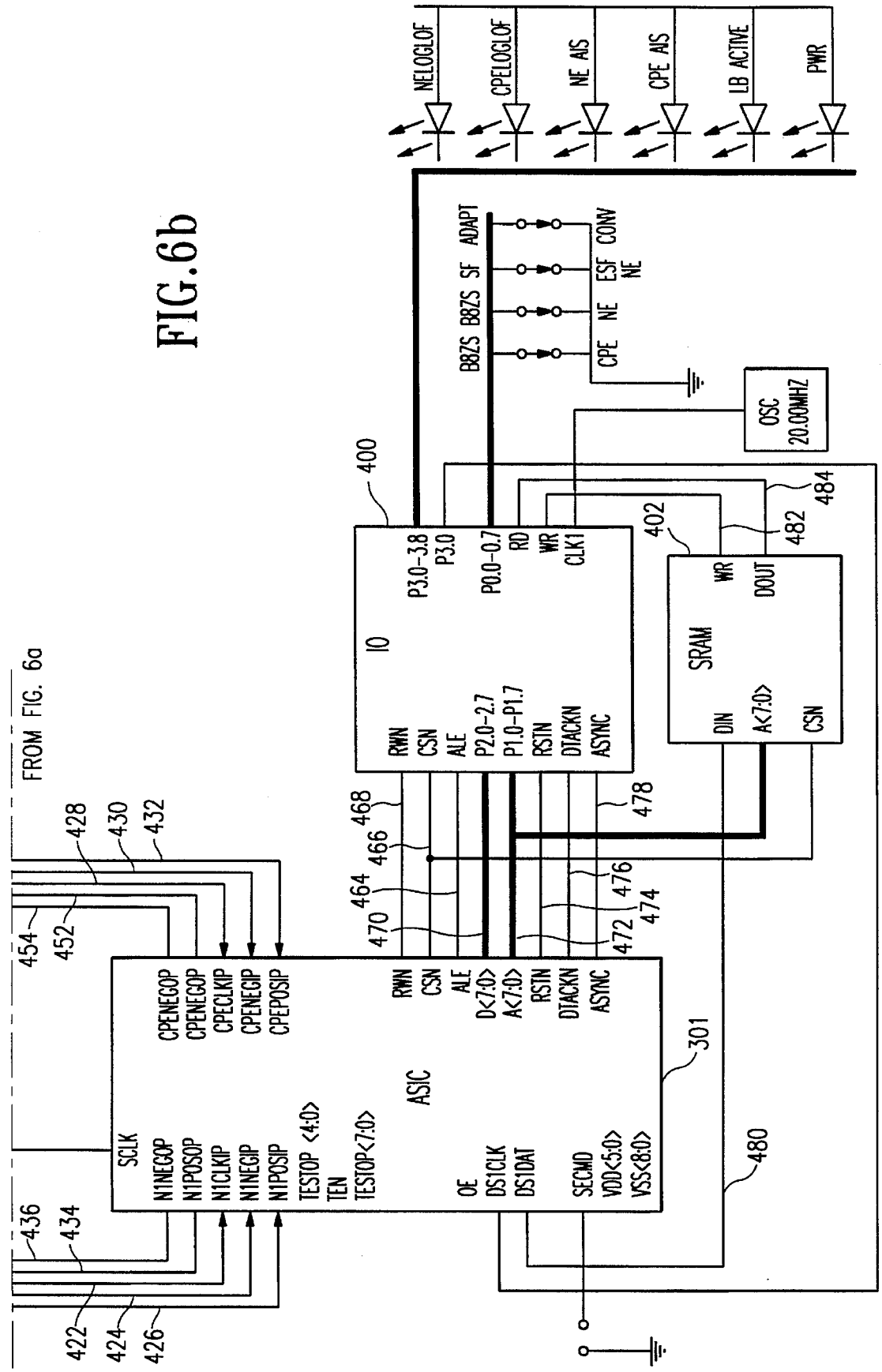

This auto-provisioning function is performed by software executed by the command and control block 300, together with a microprocessor 400 (shown in FIG. 6). The Remote Module 100 has the ability to sense all commonly used frame formats. In the preferred embodiment of the present invention, a conversion from SF to ESF is performed either by both or neither Remote Modules 100 communicating over a DS1 path or line. That is, at any point along a DS1 path or line, the network will be structured such that the intended frame format is the same in both directions of transmission. Accordingly, when the present invention is operating in auto-provisioning mode, receipt of ESF frames from the network and SF frames from the CPE 104 will cause the Remote Module 100 in accordance with the preferred embodiment of the present invention to convert the ESF frames received from the network to SF format before transmitting them to the CPE. Likewise, the SF frames that are received from the CPE 104 are converted to ESF format before transmission to the network.

In the case in which the present invention receives either SF or an unframed signal from the network, no conversion in either direction is to be performed (i.e., the Remote Module becomes transparent to the system). Likewise, if ESF is received from both the network and the CPE 104, then the Remote Module in accordance with the present invention will appear transparent to the system.

In one embodiment of the present invention, when (1) a Remote Module 100 is in autoprovisioning mode; (2) an LOS defect, LOS failure, AIS defect, or AIS failure terminates; and (3) a signal that does not meet LOS or AIS criteria is received both from the CPE 104 and from the network, then the Remote Module 100 that was previously operating transparent to the system (i.e., not converting the frame formats) will begin to send a two second "burst" of ESF-formatted DS1 signal toward the network by performing a format conversion (if required). The Remote Module 100 will observe the signal from the network and will continue to perform the conversion after the two second period if the signal observed from the network changes to ESF format.

Data Flow Through the Remote Module

Referring simultaneously to FIGS. 5 and 6, bipolar signals are received from the network over the "tip-1" 410 and "ring-1" 412 receive lines. After transmission through a receive protection circuit 414, the bipolar signals are transmitted to a transceiver 416 over the N1TIP 418 and N1RING 420 signal lines. The transceiver 416 converts the bipolar signals to unipolar signals which are comprised of 2 dual-rail signals (1 positive rail and 1 negative rail) and a clock. Specifically, the transceiver 416 converts the bipolar signals received from the N1 TIP 418 and N 1RING 420 signal lines into unipolar signals and transmits the unipolar signals over 3 network-receive data lines: N1CLKIP 422, N1NEGIP 424, and N1POSIP 426. The transceiver 416 similarly converts the bipolar signals generated by the CPE into unipolar signals and transmits the unipolar signals over 3 CPE-receive data lines: CPECLKIP 428, CPENEGIP 430, and CPEPOSIP 432. In the illustrated embodiment, the 6 receive data lines communicate with the ASIC 301 which is shown in more detail in FIG. 5.

Data is output by the ASIC 301 to the CPE 40 and the network through the conventional transceiver 416, such as ST10013 manufactured by level one. For example, 2 unipolar output signals are transmitted by the ASIC 301 over 2 data lines N1POSOP 434 and N1NEGOP 436. The transceiver 416 converts the 2 unipolar signals into 2 bipolar signals for transmission over the bipolar signal lines N2TIP 438 AND N2RING 440. The bipolar signals are transmitted through an equalizer 442, a line build-out switch 444, a protection circuit 446, and to the network over "tip-2" 448 and "ring-2" 450 transmit lines. The transceiver 416 similarly converts 2 unipolar signals generated by the ASIC 301 (CPENEGOP 452 and CPEPOSOP 454) into bipolar signals and transmits the bipolar signals over 2 CPE-transmit signal lines: C1TIP 456 and C1RING 458. The bipolar signals are transmitted to the CPE over T1-C 460 and R1-C 462 tip and ring lines.

The ASIC 301 and the microprocessor 400 communicate with each other over a read/write control line 464, a chip select (CS) control line 466, an address latch enable (ALE) control line 468, an 8-bit data bus 470, an address bus 472, an RSTN control line 474, a DTACK control line 476, and an ASYNC control line 478. As shown in FIG. 6, the microprocessor 400 and the ASIC 301 have access to a static random access memory (SRAM) 402 via shared address and control lines. The SRAM 402 is preferably implemented with a 16 k×1 device. Data is output by the ASIC 301 over a DS1DAT data line 480. The microprocessor 400 accesses data which is stored in the SRAM 402 by addressing the desired memory location (using the address bus 472), asserting the CSN line 468 low, and asserting a read control signal 482 high (i.e., to a logical "1"). The data stored at the memory location present on the address bus 472 is output by the SRAM 402 on data output lines 484. The microprocessor 400 and the ASIC 301 work together to implement the functions provided by the present invention. In one embodiment of the present invention, the microprocessor 400 is generally responsible for ensuring that the T1 frames are properly aligned after frame format conversion. In addition, the microcontroller 400 monitors the RPMs. Still further, the microcontroller 400 monitors status of manual switches and illuminates indicators, such as LED displays.

Referring again to FIG. 5, the data flow through the ASIC 301 is now described in more detail. The data received from the network enters the ASIC 301 on data lines N1POSIP 426 and N1NEGIP 424. The received data is registered with the received clock N1CLKIP 422. The CLK SYNC block 302 synchronizes the data to a master clock SCLK. The output of the CLK SYNC block 302 is routed to the command and control block 300, a 2-to-1 multiplexer 372, and a 3-to-1 multiplexer 374. As described below in more detail, the multiplexer 372 selects between 2 possible sources for data which are output by the ASIC 301 onto the network output signal lines N1POSOP 434 and N1NEGOP 436. The select control lines (not shown) of the multiplexers 372 and 374 are controlled by the command and control block 300. For example, when perforating a network loopback function, the multiplexers 372 and 374 are commanded by the control block 300 to select the CLK SYNC 302 output lines 376, 378, and 380. As a result, during loopback, the signals presented on the tip- 1410 and ring- 1412 signal lines are rerouted by the remote module 100 to the tip-2 448 and ring-2 450 signal lines (respectfully) for re-transmission to the network. The multiplexers 382 and 384 function in a similar manner during a CPE loopback function. That is, during a CPE loopback, the select control lines of the multiplexers 382 and 384 are selected by the control block 300 to re-route the signals presented on the CPE input data lines (e.g., CPEPOSIP 432 and CPENEGIP 430) to the CPE output data lines (e.g., CPEPOSOP 454 and CPENEGOP 452).

The data outputs of the CLK SYNC 302 and the CLK SYNC 340 are routed to the command and control block 300. The command and control block 300 processes the data received from the CLK SYNC blocks, 302, 340 and transfers the received data to the SRAM 402 (FIG. 6) over the data line DS1DAT 480. The control block 300 stores configuration information for the ASIC. It also reports status and error counts back to the microprocessor. The SRAM is used to store a snapshot of the incoming data stream to be used by the microcontroller to perform off-line framing on the signal. Data received from the network (i.e., overthe receive data lines N1POSIP 426 and N1NEGIP 424), and processed by the CLK SYNC 302, is transmitted to the B8ZS/AMI decode block 304. As described above, the B8ZS/AMI decode blocks 304, 342 allow the remote module 100 to accommodate two different types of "zero suppression" techniques: Binary with Eight Zeros Substitution and Alternate Mark Inversion. The conversion of data between the two zero suppression techniques is well known in the art.

As shown in FIG. 5, the output of the B8ZS/AMI decode block 304 is coupled via data line 386 to a second input line of a 4-to-1 multiplexer 388. The select control lines (not shown) of the multiplexer 388 are controlled by the command and control block 300. By controlling the select control lines of the multiplexer 388, the command and control block can selectively control the data that is input to the AMI/B 8ZS encode block 328 and the data that is eventually output to the CPE output data lines 452, 454. For example, to output unmodified CPE output data, the command and control block 300 selects the second input of the multiplexer 388 (e.g., by presenting a binary "01" on the select control lines), which is coupled to the data line 386, for output to the encode block 328. However, when the command and control block 300 selects any of the other 3 inputs to the multiplexer 328, the data received from the network via data lines 424, 426 is modified before being transmitted to the CPE 40.

For example, when the control block 300 selects the first input of the multiplexer 388, the multiplexer selects input line 390. Input line 390 is tied to a logical "high" signal, which forces the output of the multiplexer 388 to output logical "1's" when the input line 390 is selected. The command and control block 300 selects input line 390 when generating an AIS signal to the CPE 40. The command and control block 300 generates the AIS signal when it detects errors in the signal received from the network. The AIS signal is generated by overwriting the transmit data with a series of unframed logical 1's.

A similar technique is used when generating AIS signals to the network upon failure of the CPE-generated data. For example, when the control block 300 detects a loss of signal in the CPE data lines 430, 432 the control block 300 forces select lines of a 4-to-1 multiplexer 392 to select an AIS GEN input line 394. By selecting the input line 394, the control block 300 forces network output lines 434, 436 to logical 1's for a period of time. However, not all of the network output bits are overwritten with logical 1's. For example, the FDL is not overwritten with 1's. The command and control block 300 overwrites data in a manner which depends upon the FDL format used by the remote module 100. For example, if the FDL uses a "scheduled" message format, the flags "01111110" "01111110" are transmitted to the network, while all other overhead and payload bits are forced to a logical 1. This produces a signal which is easily detected by other network devices. This enables network devices to determine that the alarm is caused by CPE 40, rather than network equipment. If the FDL uses an "unscheduled" message format, all bits, with the exception of the idle code are forced to a logical 1.

By selecting the third inputs of the multiplexers 388, 392, the data output by the ASIC 301 (for transmission to either the CPE or the network) is modified as described below. For example, the third input of multiplexer 388 is coupled via data line 396 to the output of a 4-to-1 multiplexer 398. The select control lines (not shown) to the multiplexer 398 are controlled by the control block 300. When the third input of the multiplexer 388 is selected, the data presented on the data line 396 is eventually output to the CPE 40. The data that is presented on the data line 396 depends upon which of the 4 inputs of the multiplexer 398 are selected by the control block 300.

For example, if the output of the bit 20WR block 316 is selected, bit 2 of each channel byte is overwritten with a logical "0" by the remote module 100. As described above, the present invention uses 2 different means for encoding an RAI signal. One means requires overwriting bit 2 of each channel byte to 0 for a period of not less than 1 second. To accomplish this task, the control block 301 selects the output of bit OWR block 316 as the input to mulitplexer 398 whenever an RAI signal is detected. The other means requires transmitting repetitive unscheduled messages having a pattern of eight 1's followed by eight 0's. To perform this function, the control block 300 selects the output of a 3-to-1 mulitplexer 303 and concurrently selects the UNSCH MSG INS block 326 for output from the multiplexer 303. The UNSCH MSG INS block 326 provides the desired pattern of eight 1's followed by eight 0's for transmission through the multiplexer 303, the multiplexer 398, the encode block 328, and to the CPE through the output data lines 452, 454. Thus, the RAI is sent as an unscheduled FDL message in accordance with ANSI T1.403 standard.

By selecting the output of the CRC insertion block 318 via the multiplexer 398, the command and control block 300 inserts CRC codes into the data stream to be output to the CPE. A 6-bit CRC code is calculated over a superframe of data in a manner specified by national standard. A CRC code is generated after the transmission of its associated superframe of data. The CRC code is inserted into the transmitted data stream by controlling the appropriate select control lines of the multiplexers 388, 398.

By selecting the output of the FRM INS block 320 via the multiplexer 398, the command and control block 300 inserts framing patterns into the outgoing data bit stream. The FRM INS 320 block output is selected when the ASIC 301 performs frame format conversion. The FRM INS block sends the appropriate framing patterns to be overwritten during frame format conversion. The control block keeps track of and controls the locations to be overwritten for correct frame format conversion.

The Remote Module 100 may be configured to operate in a transparent state (no frame format conversion), a conversion state (SF-format to/from ESF-format), and an "autoframe" state. As described in more detail below, when the Remote Module 100 operates in the autoframe state, the command and control block 300, together with the microprocessor 400, automatically performs frame format conversion, if possible, and suppresses format conversion when required.

The Remote Module 100 performs performance monitor operations upon the signal received from the CPE 104. The parameters which are monitored by the Remote Module to generate PRMs are CRC errors, frame bit errors, line code violations (e.g., BPVs) and slips. In accordance with the ANSI Standard T1.231-1993, the Remote Module 100 detects an errored second (ES). An error condition is determined by logically-ORing the occurrence of one or more Bipolar Violations within a measured second having frame bit errors. If an error condition is detected, bit U2 (as defined by ANSI Standard T1.403-1989) of the next PRM generated and sent to the network is changed from a logic 0 to a logic 1. Patterns having the following definitions are written into the 4 Kb/s FDL channel (using the unused R bits in the PRMs):

TABLE 1

| BIT PATTERNS* | DEFINITIONS |
| --- | --- |
| 00000000..... | No Remote Module present or Remote Module disabled. |
| 11111111..... | Remote Module is generating PRMs which displace any data transmitted by the CPE on the FDL. |
| 10101010..... | Remote Module hardware fault detected. |
| 10001000..... | Remote Module present but simply passing PRMs, no generation of PRMs. |

*Bit U1 is set to a logical 0.

When the facilities data link does not carry a PRM, it is flag-filled with the following pattern: 01111110. If an LOS is detected from the network, the present Remote Module 100 transmits a yellow alarm (remote alarm indication, RAI) priority message to the telephone network 106. Such a message overwrites any PRM data being transmitted. This yellow alarm feature may be optionally disabled.

When the CPE uses an ESF-formatted signal, the Remote Module 100 treats the FDL channel in a different manner depending upon the ESF format generated by the CPE. For example, if the CPE uses an ESF without PRMs, the unused capacity of the FDL channel is used by the Remote Module 100 as described above for SF-formatted CPE signals. However, the Remote Module 100 does not need to perform SF-to-ESF conversion in this case.

If the CPE 104 uses an ESF with ANSI T1.403 PRMs, the Remote Module 100 does not write the PRMs into the FDL channel. The Remote Module 100 measures the performance of the signals received from the network from the CPE 104. If parameters are measured in the signal from the network, which would result in a non-zero parameter in a PRM, bit U1 of the next PRM which has passed through the Remote Module 100 from the CPE 104 to the telephone network 106, is changed from a logic 0 to a logic 1 value.

If parameters measured in the signal from the CPE 104 result in a non-zero parameter in a PRM, bit U2 of the next PRM, which is passed through the Remote Module 100 from the CPE 104 to the telephone network 106, is changed from a logic 0 to a logic 1 value. Patterns having the following definitions are written into the 4 Kbit/sec FDL channel which is derived from the unused R bits in the PRMs:

TABLE 2

| BIT PATTERNS | DEFINITIONS |
| --- | --- |
| 00000000..... | No Remote Module present or Remote Module disabled. |
| 11111111..... | Remote Module is generating PRMs which displace any data transmitted by the CPE on the FDL. |
| 10101010..... | Remote Module hardware fault detected. |
| 10001000..... | Remote Module present however passing through rather than generating PRMs. |

If the CPE 104 uses an ESF format with AT&T PUB 54016 Performance Reporting, the unused capacity of the FDL channel is used as described above with reference to the SF-formatted signals generated by the CPE 104. However, as before, there is no need to perform a frame format conversion. The Remote Module 100 monitors the signal received from the network for AT&T-formatted maintenance messages. Upon observing the completion of an AT&T-formatted maintenance message, the Remote Module 100 suppresses the transmission or completion of transmission of PRMs which are generated by the Remote Module 100 until either the station polled by the message completes transmission of its response message or until 500 milliseconds elapse without a transmission from the polled station. The Remote Module 100 generates ANSI-formatted PRMs and interleaves them with the AT&T PRMs generated by other network elements. Performance monitoring is not performed on unframed signals.

Relatively smooth transitions from the ESF to the SF formats have been observed in CPE signals arriving at network interfaces. These transitions have misled prior art framers to continue to declare an in-frame condition on a purported ESF signal because the prior art ESF framers do not declare a sufficient amount of errors on an SF signal to cause the declaration of an out-of-frame indication for certain alignments between the framer and such a counterfeit signal. Provision is therefore preferably made in the Remote Module 100 to avoid mistaking an SF-formatted signal for an ESF signal. The Remote Module 100 accomplishes this by preferably logically-ANDing a high frame bit error ratio (from 1-in-2 to 1-in-6 frame bits in error) with a high rate of CRC errors as an indicator of a counterfeit pattern.

Of the 12 possible alignments between the SF and ESF overhead patterns, 2 cause the SF overhead bits ($F_t+F_s$ pattern) to mimic the ESF pattern with only 1 error in 6 frame bits. Although this frame bit error ratio is too high to allow an in-frame declaration while framing, it is too low to cause an in-frame signal to go out-of-frame. However, such a "counterfeiting" of the ESF patters is accounted for by the Remote Module.

The out-of-frame blocks 310, 348 count frame errors in known fashion and generate out-of-frame signals when at least two of the last four flame bits are in error. The CRC blocks 312, 350 calculate CRC codes in a known fashion for incoming data streams. The FDL detect blocks 314, 352 monitor the position of the FDL within the data stream and in known fashion strip the FDL data from an incoming data stream. The FIFOs 322, 324, 362 and 364 buffer FDL data so that the microcontroller 400 does not need to constantly poll the ASIC 301 and thereby exhaust the microcontroller's processing resources. The FIFOs 322, 324, 362 and 364 thereby allow the microcontroller 400 to need to poll the ASIC 301 on a relatively infrequent basis which frees the microcontroller 400 to perform other functions.

A number of embodiments of the present invention have been described. Nevertheless, it will be understood that various modifications may be made without departing from the spirit and scope of the invention. Accordingly, it is to be understood that the invention is not to be limited by the specific illustrated embodiment, but only by the scope of the appended claims.

We claim:

1. An interface between a digital communications network and a customer premises equipment, comprising:

a converter, having means for distinguishing frame formats, coupled between the network and the customer premises equipment, wherein the converter receives a first digital signal from the customer premises equipment and converts the first digital signal having one of a plurality of frame formats, in response to a determination made by the means for distinguishing, into a second digital signal having a selected frame format for transmission to the network, and wherein the converter receives a third digital signal from the network and converts the third digital signal having the selected frame format into a fourth digital signal having one of a plurality, of frame formats in respone to a determination made by the means for distinguishing for transmission to the customer premises equipment.

2. The interface of claim 1, further comprising:

performance monitoring means, coupled to the converter, for monitoring the first and third digital signals.

3. The interface of claim 2, wherein the first digital signal has an extended superframe format without performance report messages, and wherein the second digital signal has an extended superframe format with performance report messages.

4. The interface of claim 3, wherein the performance report messages in the second digital signal are generated by the performance monitoring means.

5. The interface of claim 2, wherein the first digital signal uses an extended superframe format having AT&T PUB 54016 compatible performance report messages, and wherein the second digital signal uses an extended superframe format having ANSI T1.403 compatible performance report messages.

6. The interface of claim 5, wherein the ANSI T1.403 compatible performance report messages are generated by the performance monitoring means, and wherein the ANSI T1.403 compatible performance report messages are inserted into bit positions of the second digital signal which do not interfere with the AT&T PUB 54016 compatible messages.

7. The interface of claim 2, wherein the first digital signal uses an extended superframe format having ANSI T1.403 compatible performance report messages, and wherein the second digital signal uses an extended superframe format having ANSI T1.403 compatible performance report messages concatenated with performance report messages generated by the performance monitoring means.

8. The interface of claim 2, wherein the performance monitonng means monitors the first and third digital signals for bipolar violations.

9. The interface of claim 2, wherein the performance monitonng means monitors the first and third digital signals for out of frame conditions.

10. The interface of claim 2, wherein the performance monitonng means monitors the first and third digital signals for frame bit errors.

11. The interface of claim 2, wherein the performance momtonng means monitors the first and third digital signals for cyclic redundancy code violations.

12. The interface of claim 2, wherein the performance monitoring means monitors the timing drift between the first and the third digital signals.

13. The interface of claim 2, wherein the performance momtonng means monitors the timing drift between the second and the fourth digital signals.

14. The interface of claim 13, wherein the second loopback block properly decodes the loopback command signal when the command signal contains bit error ratios exceeding $10^{-3}$.

15. The interface of claim 1, further comprising:

a first loopback block, coupled to the converter, wherein the first loopback block selectively retransmits the first digital signal to the customer premises eqiupment.

16. The interface of claim 15, further comprising:

a second loopback block, coupled to the converter, wherein the second loopback block selectively retransmits the third digital signal to the network.

17. The interface of claim 16, wherein the second loopback block retransmits the third digital signal to the network when it receives a network loopback command signal from the network.

18. The interface of claim 16, wherein the second loopback block provides an in-band network loop-back function.

19. The interface of claim 16, wherein the second loopback block provides a facilities data link network loop-back function.

20. The interface of claim 16, wherein the second loopback block provides a facilities data link payload loop-back function.

21. The interface of claim 16, wherein the second loopback block retransmits the third digital signal to the network when it receives a local loopback command signal.

22. The interface of claim 1, further comprising:

a loss of signal detector, coupled to the converter, wherein the loss of signal detector determines when the first and third signals cease to be received by the interface.

23. The interface of claim 22, wherein the loss of signal detector generates an alarm indication signal to the customer premises equipment when the interface ceases to receive the third digital signal.

24. The interface of claim 22, wherein the loss of signal detector inserts an alarm indication signal into the second digital signal when the interface ceases to receive the first digital signal.

25. The interface of claim 24, wherein th unique cyclic redundancy code is 6 bits in length.

26. the interface of claim 1, wherein the first digital signal has a superframe format, and wherein the second digital signal has an extended superframe format.

27. The interface of claim 1, further comprising a cyclic redundancy code calculation block, wherein the cyclic redundancy code calculation block calculates a unique cyclic redundancy code for each extended superframe of data received by the interface.

28. The interface of claim 1, further comprising means, coupled to the converter, for detecting a loss of signal in the first digital signal, wherein the detecting means inserts a coded alarm indication signal into the second digital signal when it detects a loss of signal in the first digital signal.

29. The interface of claim 28, further comprising a loopback block, coupled to the converter, wherein the loopback block selectively retransmits the first digital signal to the customer premises equipment upon receiving a loopback command, and wherein the detecting means inserts the coded alarm indication signal into the retransmitted signal when it detects a loss of signal in the first digital signal.

30. The interface of claims 28 or 29, wherein the coded alarm indication signal comprises an unframed digital bit stream of logical ones and an unscheduled message inserted into a facilities data link.

31. The interface of claim 1, further comprising means, coupled to the converter, for detecting a loss of signal in the third digital signal, wherein the detecting means inserts a coded remote alarm indication into the second digital signal when it detects a loss of signal in the third digital signal and when the interface receives a remote alarm indication from the customer premises equipment.

32. The interface of claim 31, wherein the coded remote alarm indication signal comprises a selected unscheduled message which is inserted into a facilities data link.

33. An interface between a digital communications network and a customer premises equipment, comprising:

a converter, having a means for distinguishing frame formats, coupled between the network and the customer premises quipment, wherein the converter receives a first digital signal from the and converts the first digital signal having one of a plurality of frame formats, in response to a determination made by the means for di: into a second digital signal having a first selected frame format for to the network, and wherein the converter receives a third digital from the network and converts the third digital signal having a second selected frame format into a fourth digital signal having one of a plurality of frame formats in response to a determination made by the means for distinguishing for transmission to the customer premises equipment.

34. An interface between a digital communications network and a customer premises equipment, comprising:

a converter, coupled between the network and the customer premises equipment, wherein the converter includes a means for distinguishing frame formats and performance monitoring means for monitoring a first digital signal coupled to the converter, and wherein the converter converts the first digital signal having an extended superframe format using ANSI T1.403 compatible performance report messages into a second digital signal having an extended superframe format using ANSI T1.403 compatible performance report messages concatenated with performance report messages generated by the performance monitoring means in response to a determinbation by the means for distinguishing frame formats that the first digital signal has an extended superframe format using ANSI T1.403 compatible performance report messaeges.

35. An interface between a digital commmications network and a customer premises equipment, comprising:

a converter, having means for distinguishing frame formats, coupled between the network and the customer premises equipment, wherein the converter receives a first digital signal from the customer premises equipment and converts the first digital signal having one of a plurality of frame formats, in response to a determination made by the means for distinguishing, into a second digital signal having a selected frame format for transmission to the nework, and wherein the converter receives a third digital signal from the network and converts the third digital signal having the selected frame format into a fourth digital signal having one of a plurality of frame formats in response to a determination by the means for distinguishing for transmission to the customer premises equipment;

a loss of signal detector, coupled tc the converter, for detecting a loss of signal in the first digital signal, wherein the loss of signal detector inserts a coded alarm indication signal into file second digital signal when it detects a loss of signal in the first digital signal; and a loopback block, coupled to file converter, wherein the loopback block selectively retransmits the first digital signal to the customer premises equipment upon receiving a loopback command, and wherein the loss of signal detector inserts the coded alarm indication signal imo the retransmitted signal when it detects a loss of signal in the first digital signal.

36. The interface of claim 35, wherein the coded alarm indication signal comprises an unframed digital bit stream of logical ones and an unscheduled message inserted into a facilities data link.

37. An interface between a digital communications network and a customer premises equipment, conaprising:

a converter, having means for distinguishing frame formats coupled between the network and the customer premises equipment, wherein the converter receives a first digital signal from the customer premises equipment and converts the first digital signal having one of a plurality of frame formats in response to a determination made by the means for distinguishing into a second digital signal having a selected frame format for transmission to the network, and wherein the converter receives a third digital signal from the network and converts the third digital signal having the selected frame format into a fourth digital signal having one of a plurality of frame formats in response to a determination made by the means for distinguishing for transmission to the customer premises equipment;

a means, coupled to thje converter, for detecting a loss of signal in the third digital signal, wherein the detecting means inseerts a coded remote alarm indication into the second digital signal when it detects a loss of signal in the third digital signal and when the interface receives a remote alarm indication from the customer premises equipment.

38. The interface of claim 37, wherein the coded remote alarm indication signal comprises a selected unscheduled message4 which is inserted into a facilities data link.

39. An interface between a digital communications network and a customer premises equipment, comprising:

a converter, having means distinguishing frame formats coupled between the network and the customer premises, wherein the converter receives a first digital signal from the customer premises equipment, and converts the first digital signal having one of a plurality of frame formats in response to a determination made by the means for distinguishing into a second digital signal having a selected frame format for transmission to the network, and wherein the converter receives a third digital signal from the network and converts the third digital signal having the selected frame format into a fourth digital signal having one of a plurality of formats in response to a determination made by the means for distinguishing for transmission to the customer premises eqiupment;

means, coupled to the first and third digital signals, for detecting a loss of signal in either the first or the third digital signals;

means, coupled to the first and third digital signals, for detecting an alarm indication signal; and means, coupled to the converter, loss of signal and alarm indication detection means, for auto-provisioning the converter, wherein the auto-provisioning means selects the frame formats of the second and fourth digital signals upon detecting the presence of a second network interface coupled with the network.

40. The interface of claim 39, wherein the auto-provisioning means selects the frame formats of the second and fourth digital signals when:

(1) a loss of signal in either the first or the third digital signals terminates, (2) an alarm indication signal terminates, and (3) a signal is received from both the customer premises equipment and the network which does not meet loss of signal or alarm indication signal criteria;

and wherein the auto-provisioning means causes the converter to transmit repeated bursts of ESF-formatted data to the network, and wherein the converter monitors the third digital signal for changes in the received frame format.

* * * * *